(12) United States Patent
Ahmed et al.

(10) Patent No.: US 12,510,620 B2
(45) Date of Patent: Dec. 30, 2025

(54) SYSTEM AND METHOD FOR COMMUNICATING

(71) Applicant: DENSO International America, Inc., Southfield, MI (US)

(72) Inventors: Osman Ahmed, Southfield, MI (US); R. Michael Stitt, Ada, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 426 days.

(21) Appl. No.: 18/096,666

(22) Filed: Jan. 13, 2023

(65) Prior Publication Data

US 2023/0221402 A1 Jul. 13, 2023

Related U.S. Application Data

(60) Provisional application No. 63/299,142, filed on Jan. 13, 2022.

(51) Int. Cl.
*G01S 5/02* (2010.01)
*G01S 5/14* (2006.01)

(52) U.S. Cl.
CPC ............ *G01S 5/0246* (2020.05); *G01S 5/145* (2013.01)

(58) Field of Classification Search
None
See application file for complete search history.

(56) References Cited

U.S. PATENT DOCUMENTS

2023/0170922 A1\* 6/2023 Sittler ...................... H04B 1/48
455/552.1

\* cited by examiner

*Primary Examiner* — K. Wong
(74) *Attorney, Agent, or Firm* — Warner Norcross + Judd LLP

(57) ABSTRACT

A system and method including a first device provided on an object and configured to receive wireless communication signals from a remote device in accordance with a device signaling protocol. The first device may include a high-frequency interface operable to transmit and receive communication signals via a physical medium, where the high-frequency interface is configured to communicate via the physical medium in accordance with same device signaling protocol utilized for wireless communications.

25 Claims, 20 Drawing Sheets

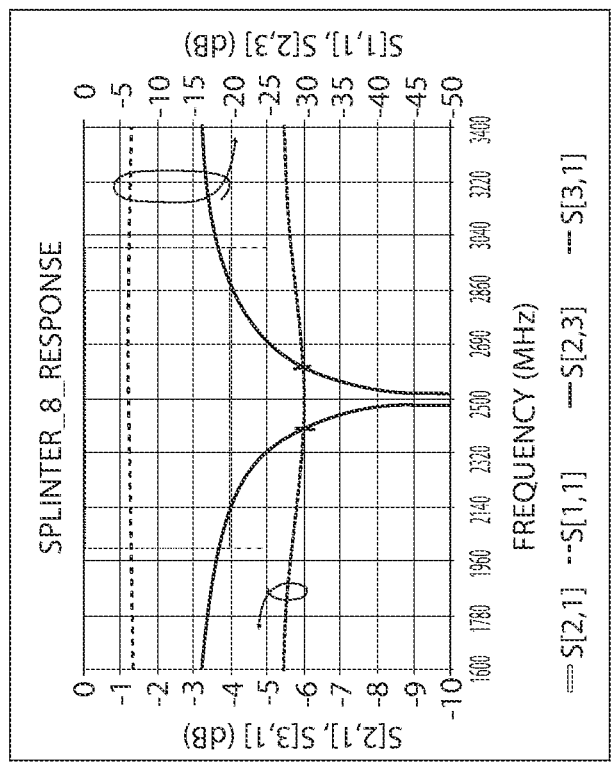
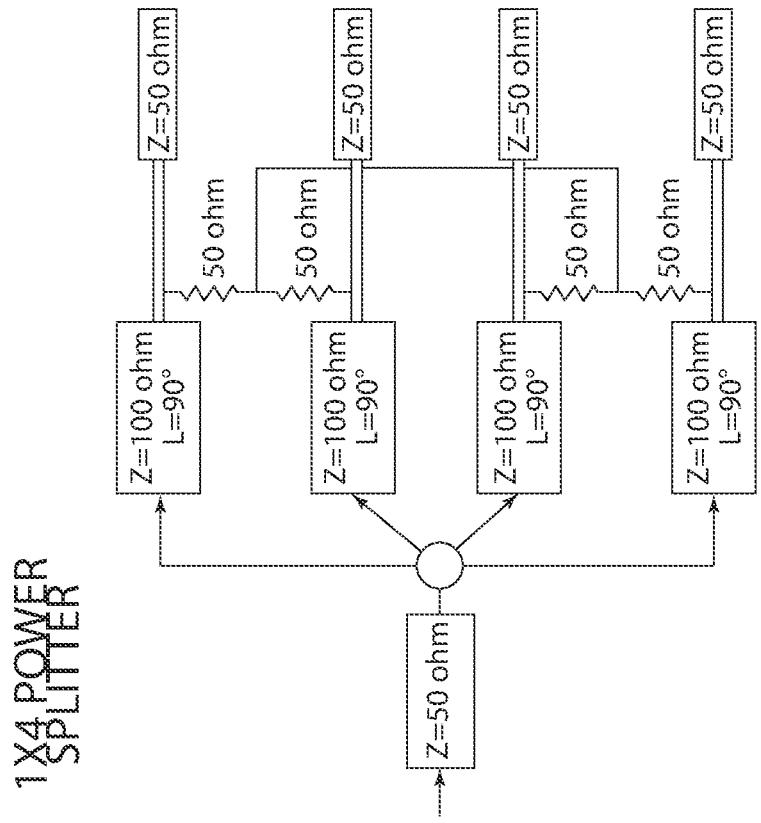
Fig. 18

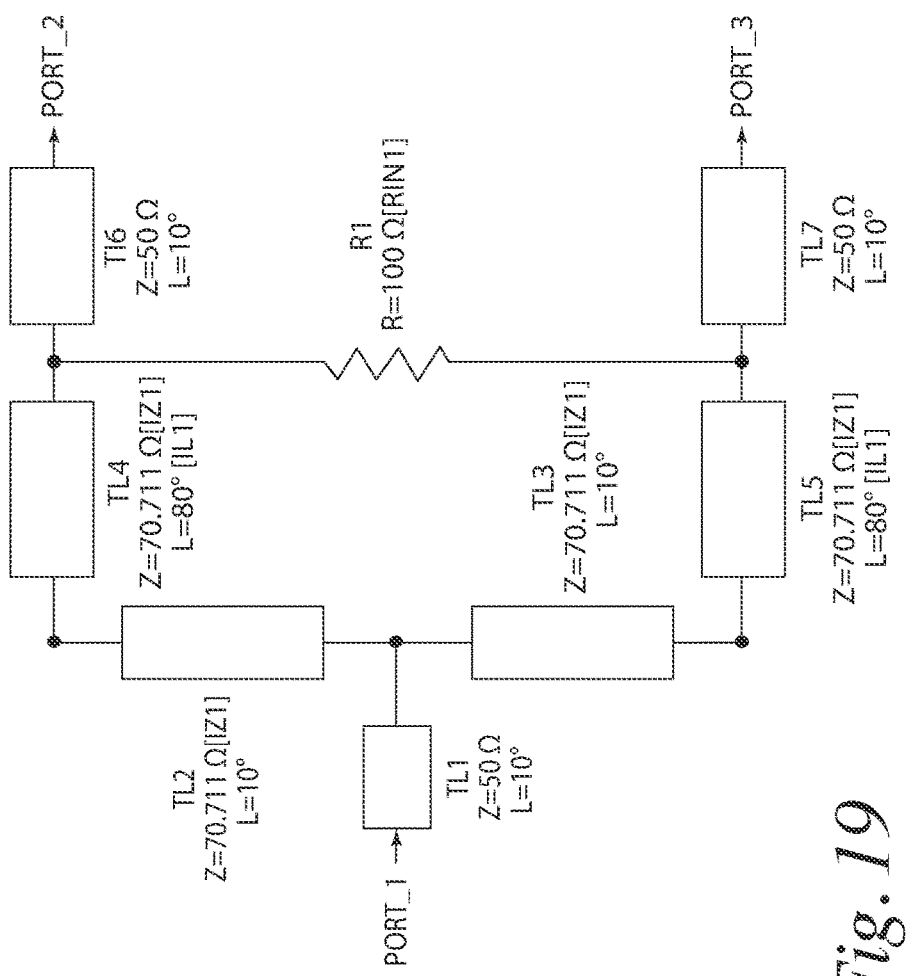
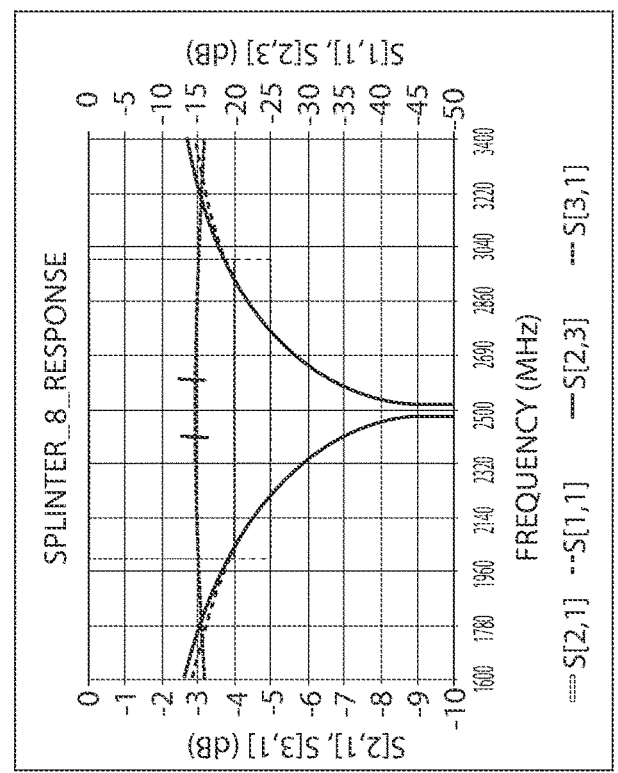
Fig. 19

STAGE BINARY 2x2x2

SYSTEM AND METHOD FOR COMMUNICATING

FIELD OF INVENTION

The present disclosure relates to a system and method for communicating on an object, such as a vehicle, and more particularly to communicating to determine a distance between a remote device and a transmitter of the object.

BACKGROUND

Real-time location or position determinations for objects have become increasingly prevalent across a wide spectrum of applications. Real-time locating systems (RTLS) are used and relied on for tracking objects, such as portable devices, in many realms including, for example, automotive, storage, retail, security access for authentication, and security access for authorization.

One conventional RTLS in the automotive realm includes a transmitter located within a vehicle and capable of communicating via radio frequency (RF) with a remote device. In many cases, a signal strength of communications between a transmitter and the remote device is used as a basis for determining a location of the remote device relative to the transmitter or vehicle. For instance, if the signal strength of communications is low, the portable device may be farther away from the vehicle relative to communications where the signal strength is high. In general, the strength of communications drops off as the distance increases between the portable device and the vehicle. The communications between a transmitter and a remote device can be sniffed by sensors disposed on the object. A signal strength of such sniffed communications can be used as a basis for determining a distance between the remote device and each respective sensor. This distance relative to each sensor may allow for a determination of a location of the remote device relative to the object.

Conventionally, the sensors transmit the sensor information, such as the signal strength, via wireless communications to another device. This other device may determine a location or range of the remote device relative to the vehicle based on the sensor information obtained from one or more sensors. The vehicle and environment can generate interference, and this interference may adversely affect the wireless transmissions from the sensors. As a result, reliability and repeatability for the location determining system can be adversely impacted.

SUMMARY

In general, one innovative aspect of the subject matter described herein can be embodied in a system comprising a first object device, a second object device, and a control system. The first object device may be disposed in a fixed position relative to an object, and may include a first antenna system configured to receive wireless communication signals from a remote device in accordance with a device signaling protocol. The first object device may include a first high-frequency interface operable to transmit and receive communication signals via a physical medium, where the first high-frequency interface may be configured to communicate via the physical medium in accordance with the device signaling protocol.

The second object device may be disposed in a fixed position relative to the object, and may include a second antenna system configured to receive wireless signals from the remote device in accordance with the device signaling protocol. The second object device may include a second high-frequency interface operable to transmit and receive communication signals with the first object device via the physical medium, where the second high-frequency interface may be configured to communicate via the physical medium in accordance with the device signaling protocol.

The control system may be configured to obtain signal information pertaining to the wireless signals received from the remote device. The control system may be configured to determine a range of the remote device relative to the object based on the signal information, where the signal information is transmitted from the second object device to the first object device via the physical medium in accordance with the device signaling protocol.

The foregoing and other embodiments can each optionally include one or more of the following features, alone or in combination. In particular, one embodiment includes all the following features in combination.

In some embodiments, the second object device may include the control system.

In some embodiments, the first object device may include RF circuitry operable to transmit and receive signals in accordance with the device signaling protocol. The first object device may include high-frequency circuitry coupled to the RF circuitry, the first antenna system, and the first high-frequency interface. The high-frequency circuitry may be configured to direct signals between the RF circuitry and the first antenna system and the first high-frequency interface.

In some embodiments, the high-frequency circuitry may be high-frequency switching circuitry operable to selectively direct signals between the RF circuitry and the first antenna system and the first high-frequency interface.

In some embodiments, the high-frequency circuitry may include high-frequency splitter circuitry operable to split an RF signal received from the RF circuitry to direct the RF signal to at least one of the first antenna system and the first high-frequency interface.

In some embodiments, the high-frequency splitter circuitry may be operable as high-frequency combiner circuitry configured to direct one or more signals received from the at least one of the first antenna system and the first high-frequency interface to the RF circuitry.

In some embodiments, the RF circuitry may include a single ended interface operable to supply the RF signal and receive a signal from the at least one of the first antenna system and the first high-frequency interface via the high-frequency combiner circuitry.

In some embodiments, the high-frequency splitter circuitry may include a single ended input operable to receive the RF signal from the RF circuitry. The high-frequency splitter circuitry may include a differential output coupled to the first high-frequency interface, where the differential output may be operable to supply first and second differential signals to the first high-frequency interface for transmission to the second object device via the physical medium.

In some embodiments, the high-frequency splitter circuitry may include a single ended output coupled to the first antenna system, where the single ended output may be operable to supply a single ended signal to the first antenna system for wireless transmission to the remote device.

In some embodiments, the first object device may include a serial interface coupled to a serial transceiver operable to transmit and receive serial signals via the serial interface. The serial interface may be configured to transmit and receive the serial signals via the physical medium, where the physical medium may be shared by the serial interface and the first high-frequency interface such that the communication signals transmitted in accordance with the device signaling protocol are superimposed with the serial signals.

In some embodiments, the first object device may include a signal coupler operable to combine and split the communication signals in the serial signals for respective transmission and reception.

In general, one innovative aspect of the subject matter described herein can be embodied in a method of communicating between first and second object devices disposed on an object, where the first and second object devices may be coupled together via a physical medium. The method may include receiving, in the first object device, wireless communication signals from a remote device in accordance with a device signaling protocol, and determining signal information pertaining to the wireless communication signals received from the remote device. The method may include transmitting, via the physical medium coupled to the first object device, communication signals in accordance with the device signaling protocol, where the signal information is encoded in the communication signals. The method may include receiving, in the second object device, wireless communication signals from the remote device in accordance with the device signaling protocol, and receiving, via the physical medium coupled to the second object device, the communication signals transmitted in accordance with the device signaling protocol. The method may include determining a range of the remote device relative to the object based on the signal information received from the first object device.

The foregoing and other embodiments can each optionally include one or more of the following features, alone or in combination. In particular, one embodiment includes all the following features in combination.

In some embodiments, the method may include splitting an RF signal received from RF circuitry of the first object device to direct the RF signal to at least one of a first antenna system and a first high-frequency interface of the first object device, and directing one or more signals received from the at least one of the first antenna system and the first high-frequency interface to the RF circuitry.

In some embodiments, the method may include supplying a first differential signal via first and second mediums that are paired to the first high-frequency interface, where first differential signal may be based on the RF signal received from the RF circuitry.

In some embodiments, the method may include providing a serial transceiver operable to transmit serial communications via a serial interface that is coupled to the physical medium, where the physical medium may include both communication signals transmitted in accordance with the device signaling protocol and serial communications transmitted by the serial transceiver.

In general, one innovative aspect of the subject matter described herein can be embodied in an object device disposed on an object and configured to determine a range of a remote device. The object device may include an antenna system configured to receive wireless communication signals transmitted by the remote device in accordance with a device signaling protocol, and a high-frequency interface operable to transmit and receive communication signals via a physical medium. The high-frequency interface may be configured to communicate via the physical medium in accordance with the device signaling protocol. The object device may include a control system configured to determine a range of the remote device relative to the object based on signal information obtained with respect to the wireless communication signals transmitted by the remote device. The control system may be operably coupled to the high-frequency interface, and may be configured to direct transmission and reception of communication signals via the high-frequency interface for transmission and receipt of data from another object device disposed on the object.

The foregoing and other embodiments can each optionally include one or more of the following features, alone or in combination. In particular, one embodiment includes all the following features in combination.

In some embodiments, the object device may include RF circuitry operable to transmit and receive signals in accordance with the device signaling protocol, and high-frequency circuitry coupled to the RF circuitry, the antenna system, and the high-frequency interface. The high-frequency circuitry may be configured to direct signals between the RF circuitry and the antenna system and the high-frequency interface.

In some embodiments, the high-frequency circuitry may be high-frequency switching circuitry operable to selectively direct signals between the RF circuitry and the antenna system and the high-frequency interface.

In some embodiments, the high-frequency circuitry may include high-frequency splitter circuitry operable to split an RF signal received from the RF circuitry to direct the RF signal to at least one of the antenna system and the high-frequency interface.

In some embodiments, the high-frequency splitter circuitry may be operable as high-frequency combiner circuitry configured to direct one or more signals received from the at least one of the antenna system and the high-frequency interface to the RF circuitry.

In some embodiments, the RF circuitry may include a single ended interface operable to supply the RF signal and receive a signal from the at least one of the antenna system and the high-frequency interface via the high-frequency combiner circuitry.

In some embodiments, the high-frequency splitter circuitry may include a single ended input operable to receive the RF signal from the RF circuitry. The high-frequency splitter circuitry may include a differential output coupled to the high-frequency interface, where the differential output may be operable to supply in-phase and out-of-phase signals to the high-frequency interface for transmission to the other object device via the physical medium.

In some embodiments, the high-frequency splitter circuitry may include a single ended output coupled to the antenna system, where the single ended output may be operable to supply a single ended signal to the antenna system for wireless transmission to the remote device.

In some embodiments, the object device may include a serial interface coupled to a serial transceiver operable to transmit and receive serial signals via the serial interface. The serial interface may be configured to transmit and receive the serial signals via the physical medium, where the physical medium may be shared by the serial interface and the high-frequency interface such that the communication signals transmitted in accordance with the device signaling protocol are superimposed with the serial signals.

In some embodiments, the object device may include a signal coupler operable to combine and split the communication signals in the serial signals for respective transmission and reception.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 18 shows a coupler in accordance with one embodiment of the present disclosure.

FIG. 19 shows a coupler in accordance with one embodiment of the present disclosure.

DETAILED DESCRIPTION

In one embodiment, a system and method are provided to communicate among devices in a system operable to determine a range between a first device (e.g., a first object device) and a remote device based on a characteristic of the communications transmitted between the first device and the remote device. The first device, in one embodiment, may be provided on the object and may be configured to receive wireless communication signals from a remote device in accordance with a device signaling protocol. The first device may also include a first high-frequency interface operable to transmit and receive communication signals via a physical medium, where the first high-frequency interface is configured to communicate via the physical medium in accordance with the device signaling protocol.

A second device may be provided on the object, and may be configured to receive wireless communication signals from the remote device in accordance with the device signaling protocol. The second object may include a second high-frequency interface operable to transmit and receive communication signals with the first object device via the physical medium, where the second high-frequency interface may be configured to communicate via the physical medium in accordance with the device signaling protocol.

As an example, the first device and the second device may be operable to receive wireless communications from the remote device that are transmitted according to a Bluetooth communication protocol. Additionally, the first and second devices may be operable to communicate between each other via high-frequency interfaces that transmit and receive communications over a physical medium in accordance with the Bluetooth communication protocol. In this example, the same device signaling protocol used for wireless communications with the remote device may be utilized for communications between devices on the object that are transmitted via a physical medium (e.g., a conductor).

In one embodiment, a control system may be provided to obtain signal information pertaining to the wireless signals received from the remote device. The control system may determine a range of the remote device relative to the object based on the signal information, wherein the signal information is transmitted from the second object device to the first object device via the physical medium in accordance with the device signaling protocol.

I. Location System Overview

Figure 1:
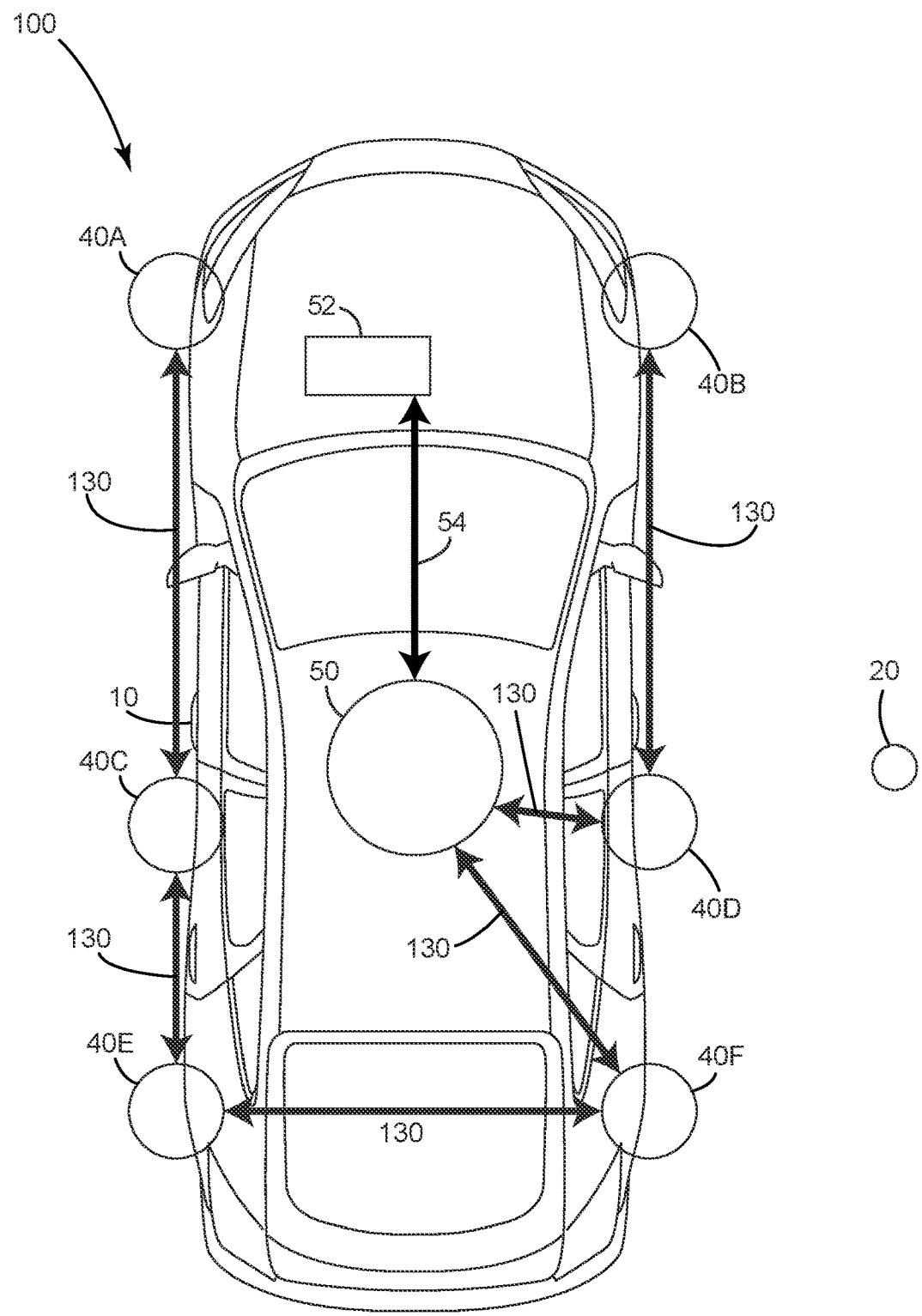
FIG. 1 shows a system in accordance with one embodiment of the present disclosure.

A system in accordance with one embodiment is shown in the illustrated embodiment of FIG. 1 and generally designated 100. The system 100 may include one or more system components as outlined herein. A system component may be a user or an electronic system component, which may be the remote device 20, a sensor 40, or an object device 50, or a component including one or more aspects of these devices. Several aspects of the remote device 20, the sensor 40, and the object device 50 may be similar. For instance, the illustrated embodiments of FIGS. 3-7 depict various embodiments of a sensor and object device, designated respectively 40, 40', 40", 400, 400' and 50, 50', 50", 500, 500'. The primary difference between the object device and the sensor pertains to the role of the device within the system 100—e.g., the object device 50 may transmit data to and receive data from the sensor 40 via a communication link 130. The object device 50 may direct operation of the sensor 40 by transmitting data to the sensor 40. The object device 50 may obtain, via the communication link 130, information from the sensor 40 indicative of a position of the remote device 20 relative to the sensor 40 and/or the object 10. One or more or all features described in connection with the sensor 40, 40', 40", 400, 400' depicted in the illustrated embodiments may be incorporated into the remote device 20.

In one embodiment, the sensor 40 and the object device 50 may form at least part of a system 100 disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 52 configured to control operation of the object 10. The object 10 may include one or more communication networks 54, wired or wireless, that facilitate communication between the object controller 52 and the object device 50. The communication network 54 for facilitating communications between the object device 50 and the object controller 52 may be a CAN bus; however, it is to be understood that the communication network is not so limited. The communication network may be any type of network, including a wired or wireless network, or a combination of two or more types of networks.

The one or more sensors 40 may be disposed in a variety of positions on the object 10, such as the positions described herein, including for instance, one or more sensors 40 in the door panel and one or more other sensors in the B pillar.

The object device 50 and the one or more sensors 40 may be powered via a power bus 120. The power bus 120 may be daisy chained from one device to the next as depicted in the illustrated embodiment of FIG. 4. Alternatively, the power bus 120 may be provided in the form of a star connection with power being supplied from one location to multiple locations via separate connections. Power supply and architecture is not limited to any one type—for instance, power may be distributed via both a daisy chain and star connection configurations.

The system 100 in the illustrated embodiment may be configured to determine location information in real-time with respect to the remote device 20. In the illustrated embodiment of FIG. 1, a user may carry the remote device 20 (e.g., a smartphone). The system 100 may facilitate locating the remote device 20 with respect to the object 10 (e.g., a vehicle) in real-time with sufficient precision to determine whether the user is located at a position at which access to the object 10 or permission for an object 10 command should be granted.

For instance, in an embodiment where the object 10 is a vehicle, the system 100 may facilitate determining whether the remote device 20 is outside the vehicle but in close proximity, such as within 5 feet, 3 feet, or 2 feet or less, to the driver-side door 15. This determination may form the basis for identifying whether the system 100 should unlock the vehicle. On the other hand, if the system 100 determines the remote device 20 is outside the vehicle and not in close proximity to the driver-side door (e.g., outside the range of 2 feet, 3 feet, or 5 feet), the system 100 may determine to lock the driver-side door. As another example, if the system 100 determines the remote device 20 is in close proximity to the driver-side seat but not in proximity to the passenger seat or the rear seat, the system 100 may determine to enable mobilization of the vehicle. Conversely, if the remote device 20 is determined to be outside close proximity to the driver-side seat, the system 100 may determine to immobilize or maintain immobilization of the vehicle.

Figure 8:
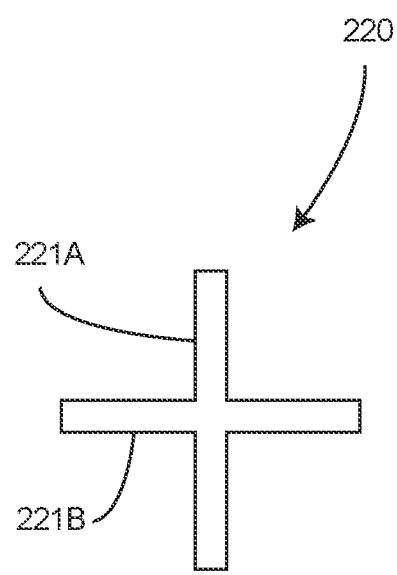
FIG. 8 depicts an antenna array in accordance with one embodiment of the present disclosure.

The object 10 may include multiple object devices 50 or a variant thereof, such as an object device 50 including a sensor 40 coupled to an antenna array 220, in accordance with one or more embodiments described herein. The antenna array 220 may include one or more antennas and may be configured in a variety of ways to facilitate wireless communications. An example embodiment of an antenna array having two orthogonal antennas is depicted in the illustrated embodiment of FIG. 8.

Figure 4:
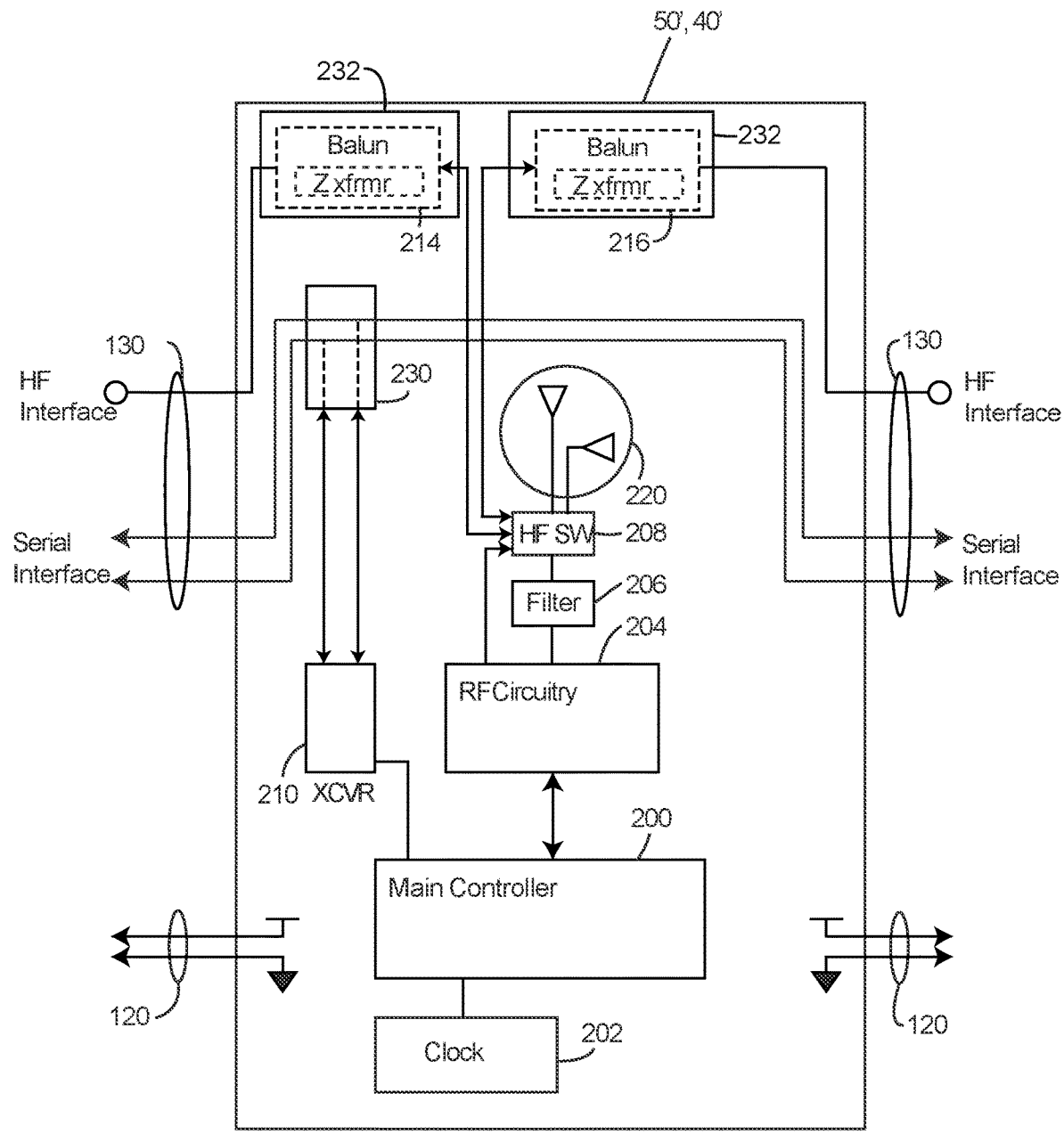
FIG. 4 shows an alternative device of the system in accordance with one embodiment.

In one embodiment, the object device 50 may be configured to communicate directly with one or more sensors 40 via the communication link 130, which as described herein, may include one or more interfaces, such as both a high frequency (HF) interface 232 and a serial interface 230. The one or more interfaces may be established via one or more physical mediums—for instance, in the case of both a HF interface 232 and a serial interface 230 as depicted in FIG. 4, the HF interface 232 may be established via a physical medium in the form of coax or twisted pair conductors, and the serial interface 230 may be established via a physical medium in the form of twisted pair conductors. As another example, both the HF interface 232 and the serial interface 230 may be established via the same physical medium, which may be a twisted pair of conductors.

Figure 2:
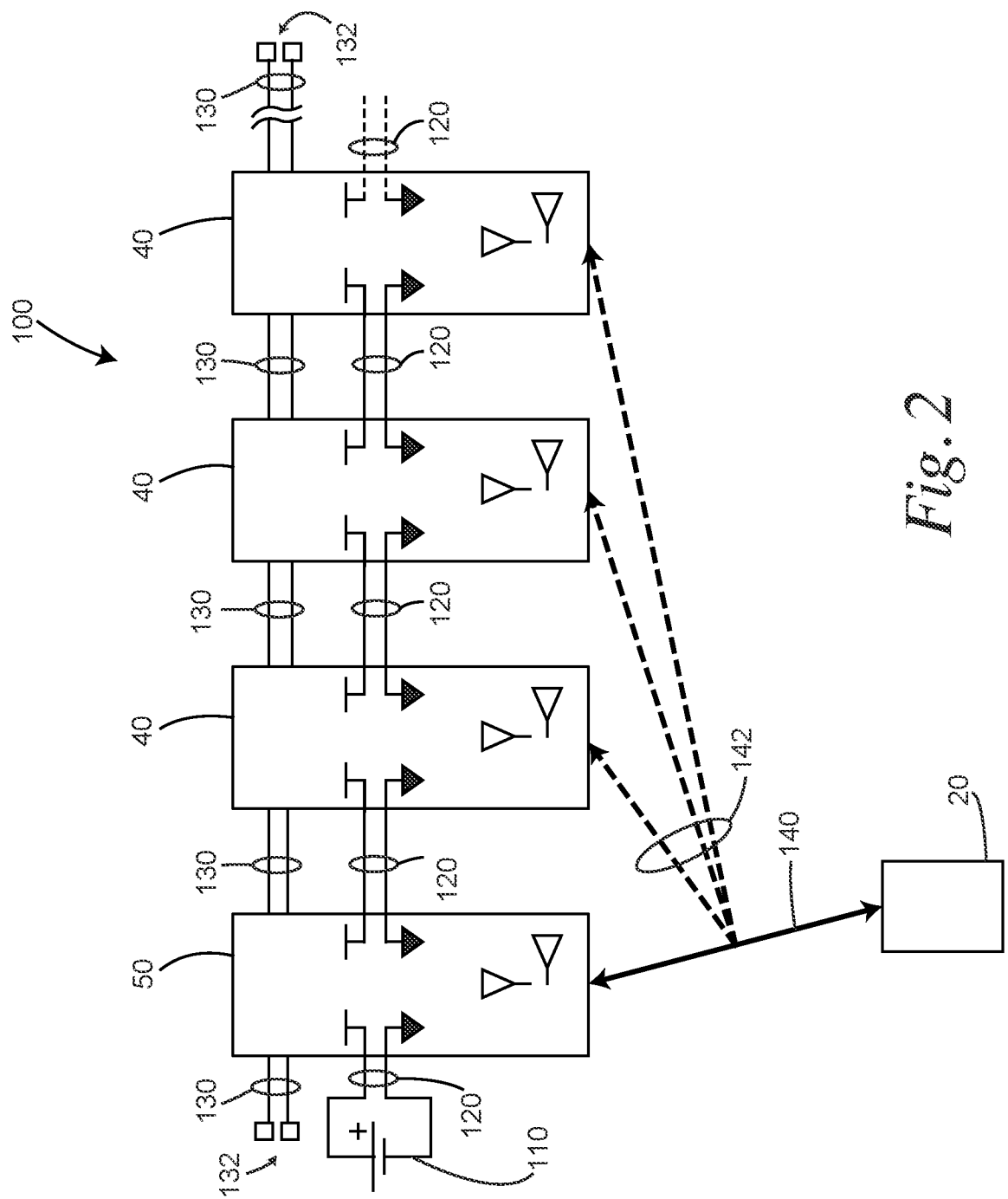
FIG. 2 shows a system in accordance with one embodiment.

In the illustrated embodiment of FIG. 2, the communication link 130 is distributed from one device to another and includes a terminator 132 at each end. The communication link 130 among the devices may be a shared link or a separate link for each device, or a combination thereof. For instance, the communication link 130 may be shared among two or more devices as depicted, and additionally or alternatively, the communication link 130 may be established separately from one device to another device. A device may communicate via more than one separate communications line 130, and may be configured to relay communications from one communication link 130 to another communication link 130.

In addition to or alternative to one or more location techniques described herein, micro-location of the remote device 20 may be determined in a variety of ways, such as using information obtained from a global positioning system, one or more signal characteristics of communications from the remote device 20, and one or more sensors (e.g., a proximity sensor, a limit switch, or a visual sensor), or a combination thereof. An example of microlocation techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

Figure 3:
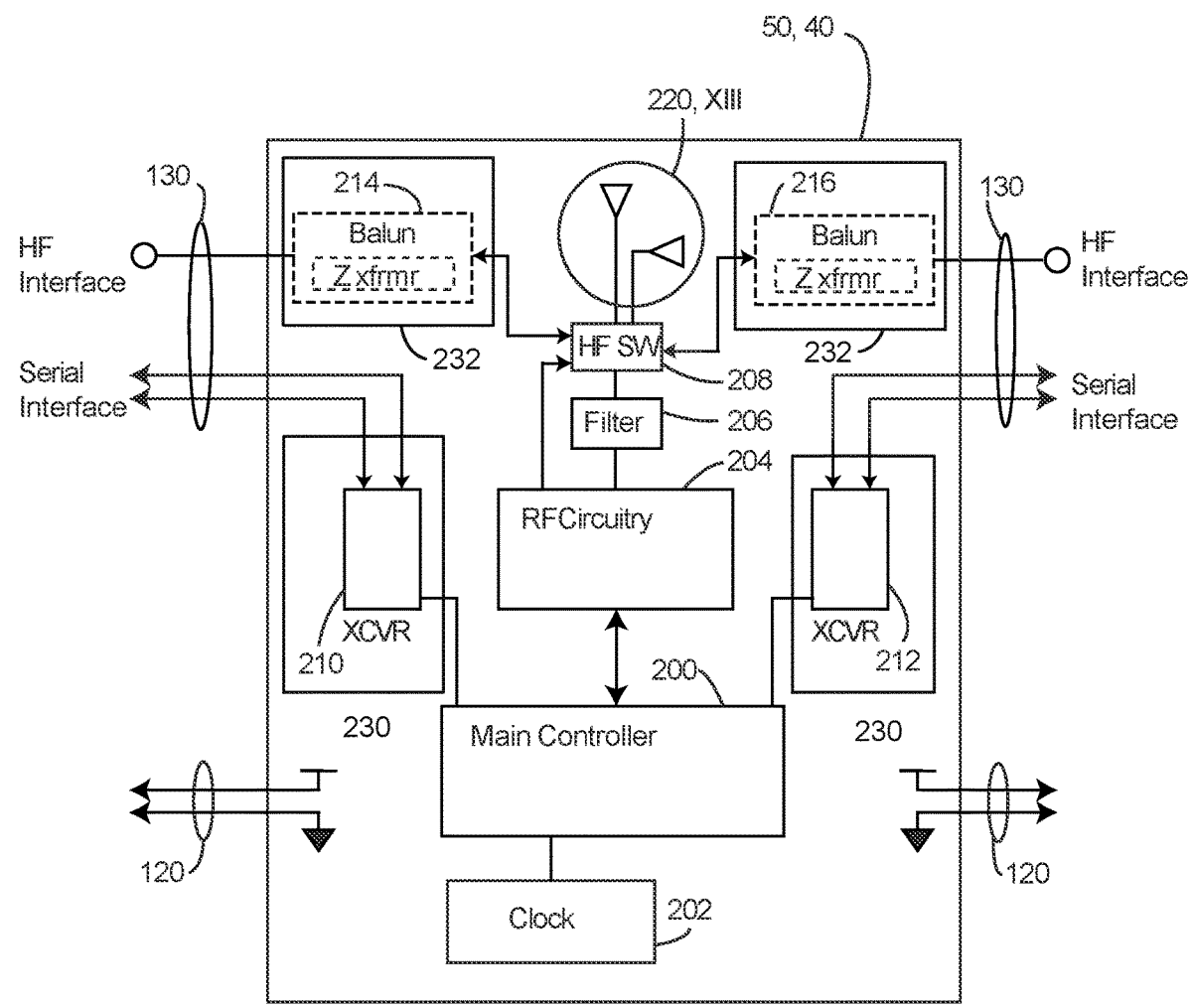
FIG. 3 shows a device of the system in one embodiment.

In the illustrated embodiment of FIGS. 1-3, the object device 50 (e.g., a system control module (SCM)) and a plurality of sensors 40 (each coupled to an antenna array 220 as shown in FIGS. 3-7) may be disposed on or in a fixed position relative to the object 10. Example use cases of the object 10 include the vehicle identified in the previous example, or a building for which access is controlled by the object device 50.

The remote device 20 may communicate wirelessly with the object device 50 via a communication link 140, such as a Bluetooth communication link (e.g., standard Bluetooth, Bluetooth Low Energy (BTLE), or BTLE High Accuracy Distance Measurement (BTLE-HADM)) or an Ultra Wideband (UWB) communication link. The plurality of sensors 40 may be configured to sniff the communications of the communication link 140 between the remote device 20 and the object device 50 as shown in phantom lines 142. The sniff communications or transmissions may correspond to a tone exchange (one-way or two-way) between the object device 50 and the remote device 20. Based on the sniffed communications, a sensor 40 may determine one or more signal characteristics of the communications as described herein, including a phase characteristic of the communications. Additional or alternative signal characteristics include a signal strength, time of arrival, time of flight, angle of arrival, or a combination thereof. The determined signal characteristics may be communicated or analyzed and then communicated to the object device 50 via the communication link 130 separate from the communication link 140 between the remote device 20 and the object device 50.

Additionally, or alternatively, the remote device 20 may establish a direct communication link with one or more of the sensors 40, and the one or more signal characteristics may be determined based on this direct communication link. For instance, the remote device 20 and a sensor 40 may perform a tone exchange as a basis for determining a distance between the sensor 40 and the remote device 20. The tone exchange may form the basis of an analysis of a phase difference in communications, and this phase difference may be a basis for determining a time of flight and therefore range of the remote device 20.

In one embodiment, the direct communication link may be established according to the BTLE protocol; however, the present disclosure is not so limited—the direct communication link may be any type of link or links, including UWB or BTLE-HADM.

It is to be understood that an object 10, such as a vehicle, may include a number of sensors 40 that can be greater than or less than the number shown in the illustrated embodiment of FIGS. 1 and 2. Depending on the implementation, some number of sensors 40 may be integrated in a vehicle.

As described herein, one or more signal characteristics, such as a phase characteristic, a signal strength, time of arrival, time of flight, and angle of arrival, may be analyzed to determine location information about the remote device 20 relative to the object 10, an aspect of the object 10, or the object device 50, or a combination thereof. For instance, a phase rotation of a tone transmission, and optional re-transmission, or a phase characteristic indicative of a phase rotation may form the basis for determining a distance between an object device 50 or a sensor 40 and the remote device 20. Additional examples of signal characteristics include time difference of arrival or the angle of arrival, or both, among the sensors 40 and the object device 50 may be processed to determine a relative position of the remote device 20. The positions of the one or more antenna arrays 220 relative to the object device 50 may be known so that the relative position of the remote device 20 can be translated to an absolute position with respect to the antenna arrays 220 and the object device 50.

Additional or alternative types of signal characteristics may be obtained to facilitate determining position according to one or more algorithms, including a distance function, trilateration function, a triangulation function, a lateration function, a multilateration function, a fingerprinting function, a differential function, a time of flight function, a time of arrival function, a time difference of arrival function, an angle of departure function, a geometric function, or any combination thereof.

II. System Device Overview

In the illustrated embodiment of FIG. 3, the object device 50 is shown in further detail. The structure and configuration of the object device 50 may be incorporated into the object device 50, so the sensor 40 is also referenced as the object device 50 in the illustrated embodiment. Likewise, the structure of the sensor 40', 40", 400, and 400' in the illustrated embodiments of FIGS. 4-7 may be incorporated into an object device 50', 50", 500, 500' and so the sensors are referenced accordingly in the illustrated embodiments.

The object device 50 in the illustrated embodiment of FIG. 3 includes several components, one or more of which may be provided in a commercial embodiment. The object device 50 in some instances may be described as an anchor disposed on the object 10.

The object device 50 may include RF circuitry 204 operable to control transmission and reception of HF signals. The RF circuitry 204 may be operably coupled to an antenna array 220, which may include one or more antennas. An example configuration of an antenna array 220 is depicted in the illustrated embodiment of FIG. 8, with a plurality of antennas 221A, 221B. The plurality of antennas 221A, 221B, optionally more than two, may provide spatial diversity such that they do not receive the same waves. For instance, each of the plurality of antennas may be disposed at different locations to provide spatial diversity. As another example, the plurality of antennas may have different slant polarizations (e.g., circular polarization with lead or lag relative to each other).

The RF circuitry 204 may be configured to supply or receive high-frequency signals from the antenna array 220 via filter circuitry 206 and a HF switch 208. The filter circuitry 206 may condition the signal output from the RF circuitry 204 for driving the antenna array 220. Conversely, the filter circuitry 206 may condition a signal received from the antenna array 220 for processing by the RF circuitry 204. The HF switch 208 may selectively direct input and output of HF signals, including HF supplied to and received from the antenna array 220.

In one embodiment, the RF circuitry 204 may be configured according to one embodiment to transmit and receive signals via HF interface 232 of the communication link 130. Transmission and reception of HF signals in one embodiment may enable an object device 50 to communicate via a physical medium according to a communication protocol that is the same or similar to the one utilized by the antenna array 220 in the RF circuitry 204. For instance, the object device 50 may transmit and receive communications via a physical medium defined by the HF interface 232 that correspond to the BTLE communications, while also transmitting and receiving communications via the antenna array 220 that correspond to BTLE communications.

The HF switch 208 may selectively direct output from the RF circuitry 204 to the HF interface 232 of the communication link 130, and selectively direct input from the HF interface 232 of the communication link 130 to the RF circuitry 204. In one embodiment, the HF interface 232 may be a single ended configuration, such as a coaxial conductor arrangement. Alternatively, the HF interface 232 may be differential, and optionally include conditioning circuitry 214, 216 (e.g., a balun and/or an impedance transformer) for translating between a single ended output from the HF switch 208 and a differential output of the HF interface 232.

In the illustrated embodiment, the object device 50 is configured to transmit and receive communications via separate HF interfaces 232 provided by separate communication links 130. In other words, the two communication links 130 in the illustrated embodiment are isolated from each other, such that communications received on one communication link 130 are not inherently transmitted or seen on the other communication link 130. As discussed herein, the object device 50 may be configured to relay communications from one of the communication links 130 to the other of the communication links 130. For example, communications received via one high-frequency interface may be directed to the RF circuitry 204, and may be relayed to the other high-frequency interface via the RF circuitry

204. The HF switch 208 may be configured to transition from one state to another state to facilitate relaying of such communications. It is to be understood, however, that in one or more embodiments described herein, communications transmitted via one of the communication links 130 may inherently pass to the other of the communication links 130.

The object device 50 may include a main controller 200 and may be configured to direct operation of the RF circuitry 204, as described herein. In one embodiment, the main controller 200 may control communications with the remote device 20 and optionally obtain one or more sensed characteristics with respect to such communications to be used as a basis for ranging the remote device 20. Additionally, or alternatively, the object device 50 may sniff communications between a sensor 40 and the remote device 20 and obtain one or more sensed characteristics with respect to the sniffed communications.

The main controller 200 may further direct transmission and reception of communications via the HF interface 232 of the one or more communication links 130. As an example, the main controller 200 may direct transmission and reception of BTLE communications via the HF interface 232 of the communication link 130. Information transmitted via the HF interface 232 of the communication links 130 may relate to one or more signal characteristics obtained with respect to communications received and/or transmitted via the antenna array 220. As an example, the information transmitted via the communication link 130 may be indicative of a sensed characteristic determined with respect to communications received and/or transmitted via the antenna array 220.

Additionally, or alternatively, the main controller 200 may utilize the high-frequency interface of the communication links 130 for time synchronization purposes. A sensed characteristic of communications may be based at least in part on a time reference of the device. And because time is translatable to distance (and conversely distance to time) with respect to electromagnetic waves, controlling the reference time of the sensor 40 may facilitate enhancing accuracy with respect to determining the distance between the remote device 20 and the object device 50.

The object device 50 may include a clock 202 that operates an oscillator for the sensor 40 and generates one or more timing signals for operation of aspects of the object device 50, including the main controller 200 and the RF circuitry 204.

In one embodiment, the main controller 200 may be configured to initially synchronize one or more timing signals provided by the clock 202 based on synchronization related communications received via the high-frequency interface of the communication links 130. To provide an example, in the context of the sensor 40 including the main controller 200 and the clock 202, the object device 50 may transmit synchronization related communications to the sensor 40 to facilitate substantially synchronizing timing signals between the object device 50 and the sensor 40. This way, sensed characteristics determined by the sensor 40 and the object device 50 may be compared or related to each other against substantially the same time reference.

In the illustrated embodiment, the object device 50 may include first and second transceivers 210, 212 coupled respectively to serial interfaces of the communication links 130. The transceivers 210, 212 may be CAN transceivers, but the present disclosure is not so limited. The transceivers 210, 212 may facilitate any type of serial or non-serial communications via the communication links 130, including but not limited to RS-485, LIN, Vehicle Area Network (VAN), FireWire, I2C, RS-232, RS-485, and Universal Serial Bus (USB).

The first and second transceivers 210, 212 may enable communications among devices (e.g., the object device 50 and a sensor 40) for information that is less time sensitive. For instance, the object device 50 may transmit to a sensor 40, via the serial interface of the communication link 130, connection parameters for the communication link 140 to enable the sensor 40 to sniff or monitor communications between the object device 50 and the remote device 20. A sensor 40 may receive such communications via the first transceiver 210 and relay the communications to another device (e.g., another sensor 40) via the second transceiver 212.

Optionally, the object device 50 may include a communication link 130 configured with a serial interface without the high-frequency interface or a high-frequency interface without the serial interface. Communications described herein with respect to one interface and not the other may be communicated via the interface provided by the communication link 130. For instance, the communication link 130 may include a high-frequency interface without the serial interface, and communications described in connection with the serial interface may be transmitted via the high-frequency interface.

The main controller 200 may include electrical circuitry and components to carry out the functions and algorithms described herein. Generally speaking, the main controller 200 may include one or more microcontrollers, microprocessors, and/or other programmable electronics that are programmed to carry out the functions described herein. The main controller 200 may additionally or alternatively include other electronic components that are programmed to carry out the functions described herein, or that support the microcontrollers, microprocessors, and/or other electronics. The other electronic components include, but are not limited to, one or more field programmable gate arrays (FPGAs), systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to, CAN, LIN, Vehicle Area Network (VAN), FireWire, I2C, RS-232, RS-485, and Universal Serial Bus (USB).

As described herein, the main controller 200 may be configured to determine a location or range of a portable device 20 relative to an object 10. The main controller 200 may include a locator, module, model, or generator, or a combination thereof, operable to determine the location or range based on one or more signal characteristics. For instance, a model for determining a range or location, in one embodiment, may include one or more core functions and one or more parameters that affect output of the one or more core functions. Aspects of the model may be stored in memory of the main controller 200, and may also form part of the controller configuration such that the model is part of the main controller 200 that is configured to operate to receive and translate one or more inputs and to output one or more outputs. Likewise, a module or a generator are parts of the main controller 200 such that the main controller 200 is configured to receive an input described in conjunction with a module or generator and provide an output corresponding to an algorithm associated with the module or generator.

The main controller 200 of the object device 50 in the illustrated embodiment of FIG. 3 may include one or more processors that execute one or more applications (software and/or includes firmware), one or more memory units (e.g., RAM and/or ROM), and one or more communication interfaces, amongst other electronic hardware. The object device 50 may or may not have an operating system that controls access to lower-level devices/electronics via a communication interface. The object device 50 may or may not have hardware-based cryptography units—in their absence, cryptographic functions may be performed in software. The object device 50 may or may not have (or have access to) secure memory units (e.g., a secure element or a hardware security module (HSM)).

The main controller 200 in the illustrated embodiment of FIG. 3 is not dependent upon the presence of a secure memory unit in any component. In the optional absence of a secure memory unit, data that may otherwise be stored in the secure memory unit (e.g., private and/or secret keys) may be encrypted at rest. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface of the main controller 200 may facilitate any type of communication link, including any of the types of communication links described herein, including wired or wireless. The communication interface may facilitate external or internal, or both, communications. For instance, the communication interface may be coupled to the RF circuitry 204 to enable communications via one or more of the antenna array 220 and the HF interface 232 of the communication link 130.

As another example, the communication interface of the main controller 200 may facilitate a wireless communication link with another system component in the form of the remote device 20, such as wireless communications according to the WiFi standard or UWB, or any combination thereof. As another example, the communication interface of the main controller 200 may include a display and/or input interface for communicating information to and/or receiving information from the user.

In one embodiment, the object device 50 may be configured to communicate with one or more auxiliary devices of a type different from the remote device 20 or the sensor 40. In other words, the auxiliary device may be configured differently from the object device 50. For instance, the auxiliary device may not include a processor, and instead, may include at least one direct connection and/or a communication interface for transmission or receipt, or both, of information with the object device 50. The auxiliary device may be a solenoid that accepts an input from the object device 50, or the auxiliary device may be a sensor (e.g., a proximity sensor) that provides analog and/or digital feedback to the object device 50.

One or more alternative embodiments of the object device 50 and sensor 40 are depicted in the illustrated embodiments of FIGS. 4-7, and generally designated 40', 40", 400, 400' and 50', 50", 500, 500". The object device and sensor in the illustrated embodiments of FIGS. 4-7 are similar in many respects to the object device 50 and sensor 40 of FIG. 3, with similar components having the same reference numeral and potentially arranged or connected in a different manner.

For instance, in the illustrated embodiment of FIG. 4, the object device 50' is substantially similar to the object device 50 with the exception of having one transceiver 210 instead of two transceivers 210, 212. In this configuration, serial communications may inherently pass between the serial interfaces of both communication links 130.

In the illustrated embodiment of FIG. 4, the object device 50' includes a serial interface 230 disposed between the transceiver 210 and the physical medium of the communication link 130. (The serial interface 230 may be present in the object device 50.) The serial interface 230 may provide a direct conductive connection between the transceiver 210 and conductors of the physical medium of the communication link 130. For instance, with the physical medium in the form of a differential pair, the serial interface 230 may provide respective direct connections between the transceiver 210 and each of the differential pairs. In an alternative embodiment, the serial interface 230 may provide a galvanically isolated coupling between the transceiver 210 and the serial interface of the communication link 130.

Figure 5:
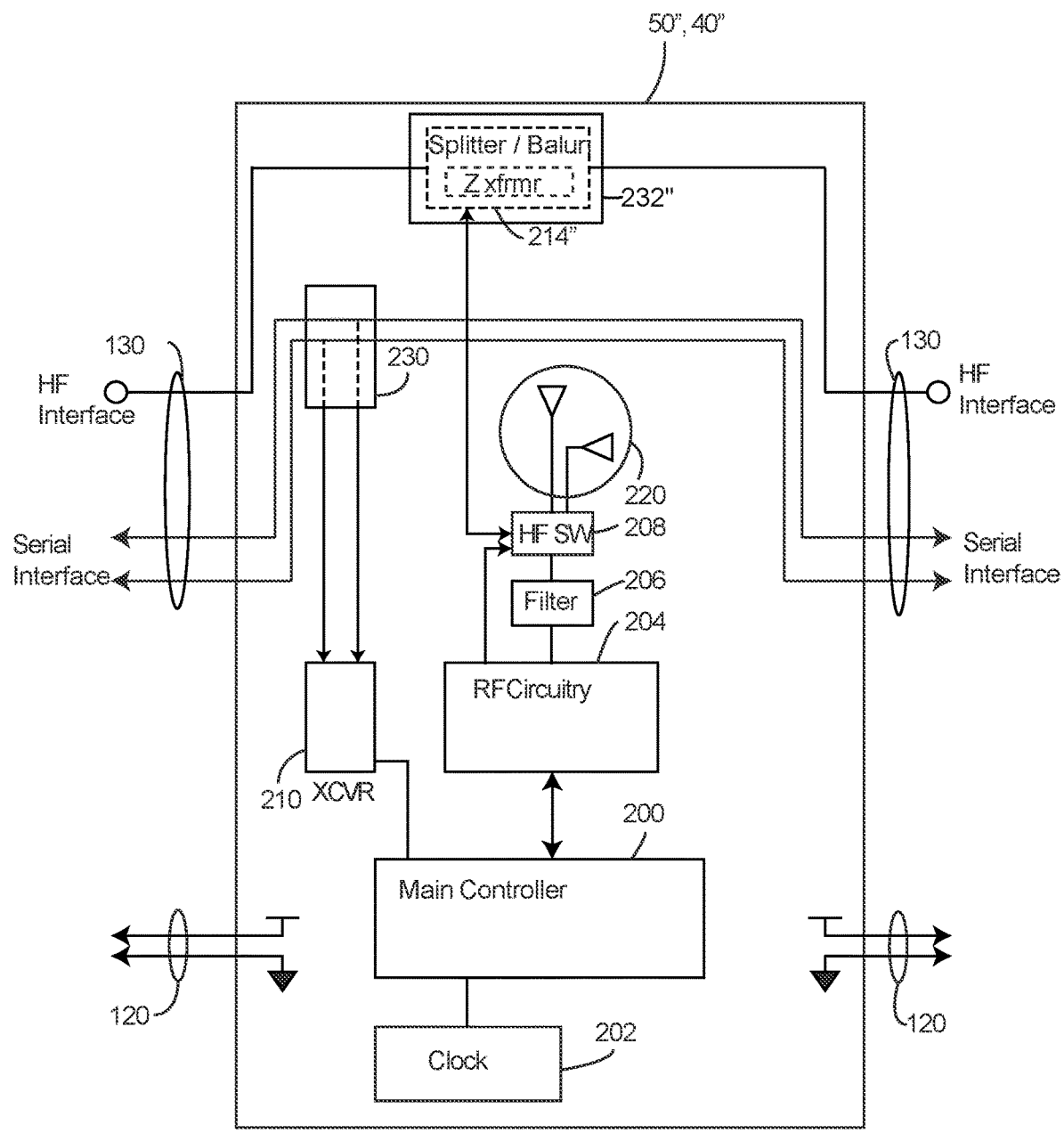
FIG. 5 shows an alternative device of the system in accordance with one embodiment.

In the illustrated embodiment of FIG. 5, an object device 50" is shown in a configuration substantially similar to the object device 50', with the exception of having HF frequency 232" and conditioning circuitry 214" operable to inherently pass or transfer communications from one communication link 130 to the other communication link 130. The conditioning circuitry 214" may be coupled to the HF switch 208 in a manner similar to the construction described in conjunction with FIGS. 3 and 4, including enabling the RF circuitry 204 to receive and transmit communications via the HF interface 232" (e.g., through the conditioning circuitry 214") of the communication link 130.

The conditioning circuitry 214" may be similar to the conditioning circuitry 214, 214', described herein. For instance, the conditioning circuitry 214" may be configured to operate as a balun and/or a splitter. The conditioning circuitry 214" may be passive circuitry, e.g., with RLC circuitry operable to split and route signals to the HF switch 208 and the communication links 130 depicted in the illustrated embodiment. The passive circuitry may be provided 1) in the form of discrete components assembled on a printed circuit board, 2) structures (e.g., RF structures) defined by the construction of the printed circuit board and inherent to the printed circuit board, 3) a packaged balun and/or splitter component, or 4) a combination thereof. The conditioning circuitry 214, 214' may be configured in a similar manner.

The HF interface 232" of the communication link 130 in the illustrated embodiment may be single ended or differential, depending on the configuration. For instance, a physical medium used by the HF interface may 232" be coaxial wire configured for single ended operation. As another example, the physical medium for the HF interface 232" may be twisted pair conductors configured for differential operation.

Although described in conjunction with two communication links 130, it is to be understood that the object device 50, 50', 50", 500, 500' may include more than two communication links 130, and that circuitry of the HF interface 232, 232', 232", such as the conditioning circuitry 214, 214', 214", may be configured accordingly (e.g., two-way, three-way, four-way) as split and route signals for communicating with the RF circuitry 204.

Figure 6:
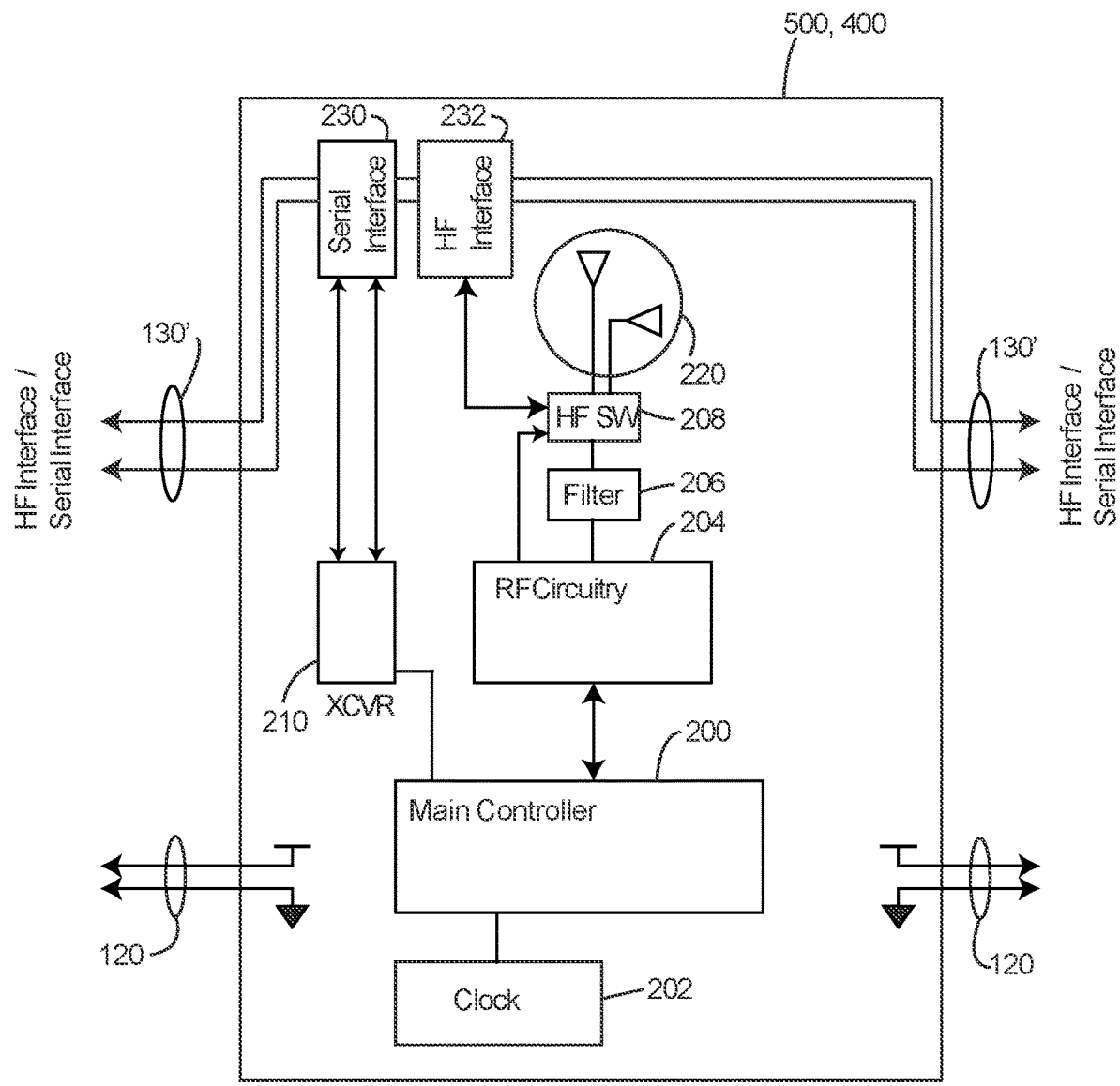
FIG. 6 depicts an alternative device of the system in accordance with one embodiment.
Figure 7:
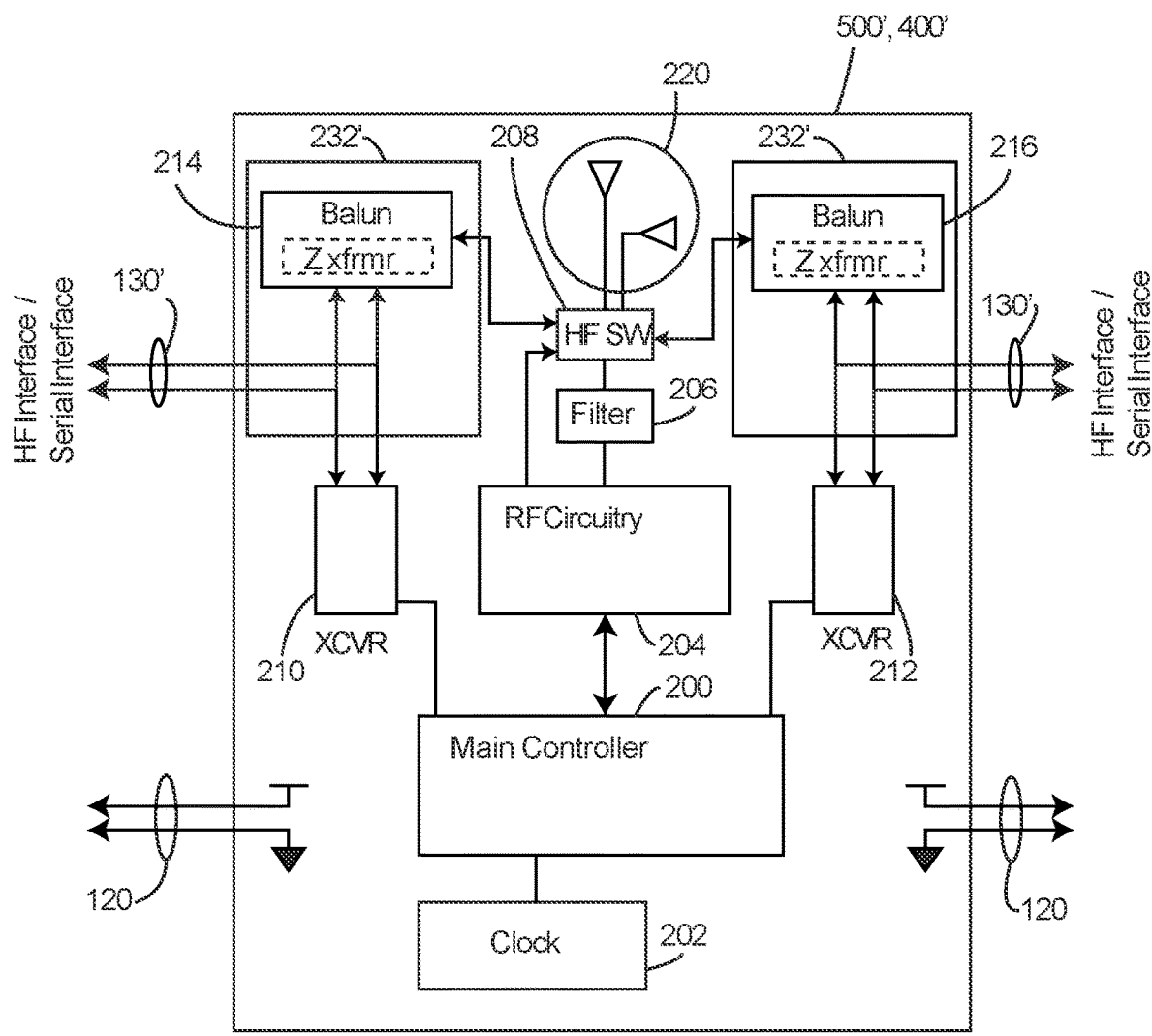
FIG. 7 shows an alternative device of the system in accordance with one embodiment.

Turning to the illustrated embodiments of FIGS. 6 and 7, the object device 500, 500' may be similar to the object device 50, 50', 50" described in conjunction with the illustrated embodiments of FIGS. 3-5. The object device 500, 500' may include one or more communication links 130' configured such that the serial interface 230 and the HF interface 232 share a physical medium. For instance, the physical medium of the communication link 130 may be a pair of conductors (e.g., a twisted pair) operable for differential communication, and both serial communications and high-frequency communications may be transmitted via the pair of conductors.

In the illustrated embodiment of FIG. 6, the object device 500 includes a serial interface 230 and a HF interface 232, each operably coupled to the communication interface 130' for transmission and reception of communications. The HF interface 232 may include circuitry similar to the conditioning circuitry 214, 214', 214", including for example one or more of a balun, splitter, and transformer. The HF interface 232 may include a single ended input or output to transfer signals to the HF switch 208, whereas the coupling to the communication link 130' provided by the HF interface 232 may be differential.

The serial interface 230 may provide a direct or indirect coupling between the transceiver 210 and the communication link 130. For instance, in the case of the communication link 130 including a differential pair, the serial interface 230 may provide direct connections to each of the conductors of the differential pair. As another example, with the communication link 130 including a differential pair, the serial interface 230 may include a transformer operable to couple signals between the communication link 130 and the transceiver 210. Additionally, or alternatively, the serial interface 230 may include optical isolation components configured to isolate one or more signals provided to the serial interface 230 from one or more signals output from the serial interface 230.

As described herein, the communication link 130 may be configured similar to the communication link 130', including for instance a physical medium for shared use of the HF interface 232 and the serial interface 230.

In the illustrated embodiment of FIG. 7, the object device 500' is similar to the object device 500 with a communication link 130' providing a shared configuration for both the HF interface 232 and the serial interface 230. In the illustrated embodiment, the object device 500' includes first and second communication links 130' such that communications received and transmitted via one communication link 130' are not inherently seen or transmitted to the other of the communication links 130'. Communications received via one interface of a communication link 130' may be redirected or relayed to an interface of the other communication link 130'.

The HF interface 232' in the illustrated embodiment of FIG. 7 may be similar to the HF interface 232 of FIG. 6, but is shown with additional conditioning circuitry in accordance with one embodiment. Specifically, the HF interface 232' of FIG. 7 includes conditioning circuitry 216 operable to condition signals between the high-frequency interface and the HF switch 208. The conditioning circuitry 216 may facilitate translating a single ended connection between the HF switch 208 and the HF interface 232' to a differential output of the communication link 130'.

III. HF Frequency Circuitry for RF communications

Figure 9:
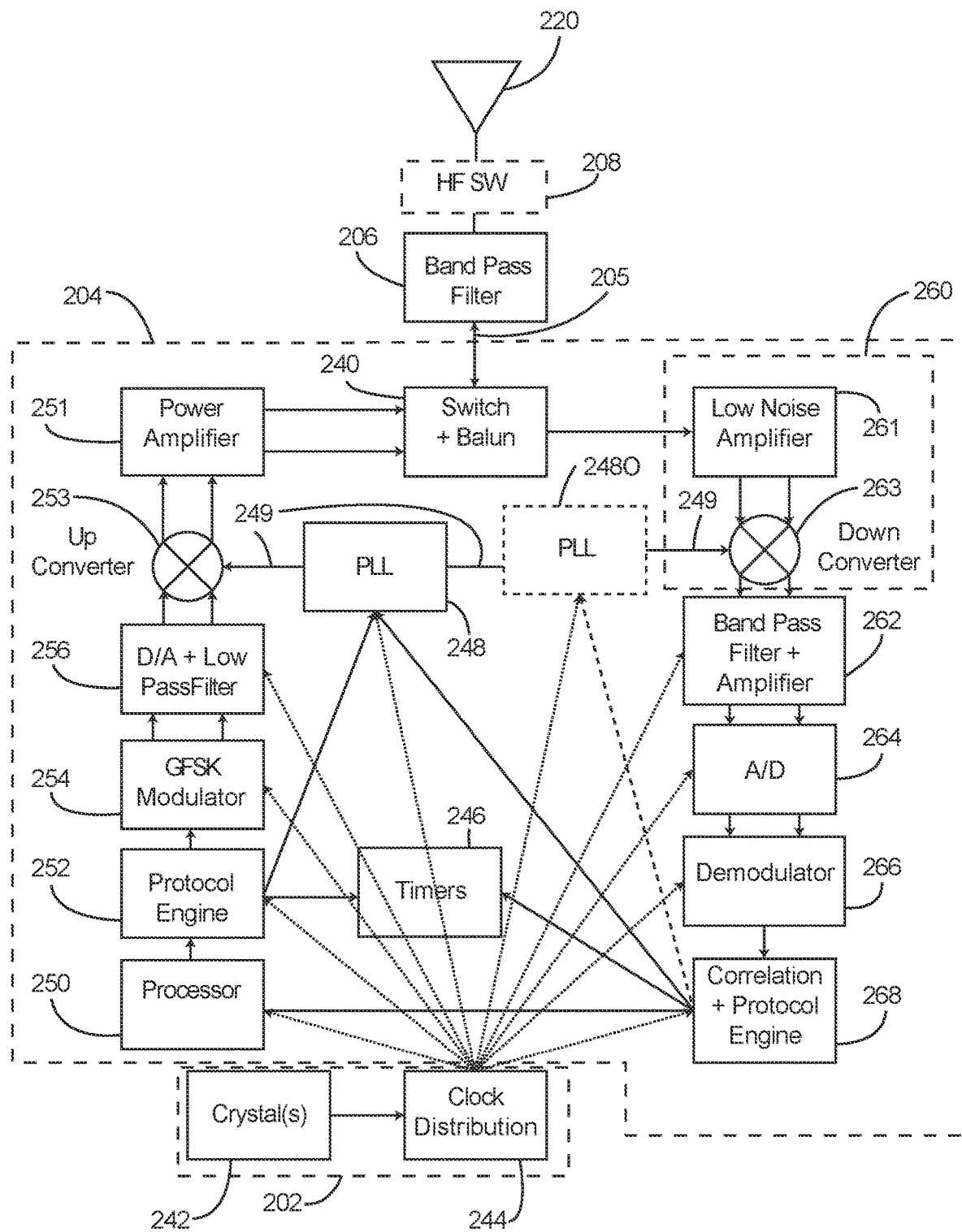
FIG. 9 shows a system in accordance with one embodiment of the present disclosure.
Figure 10:
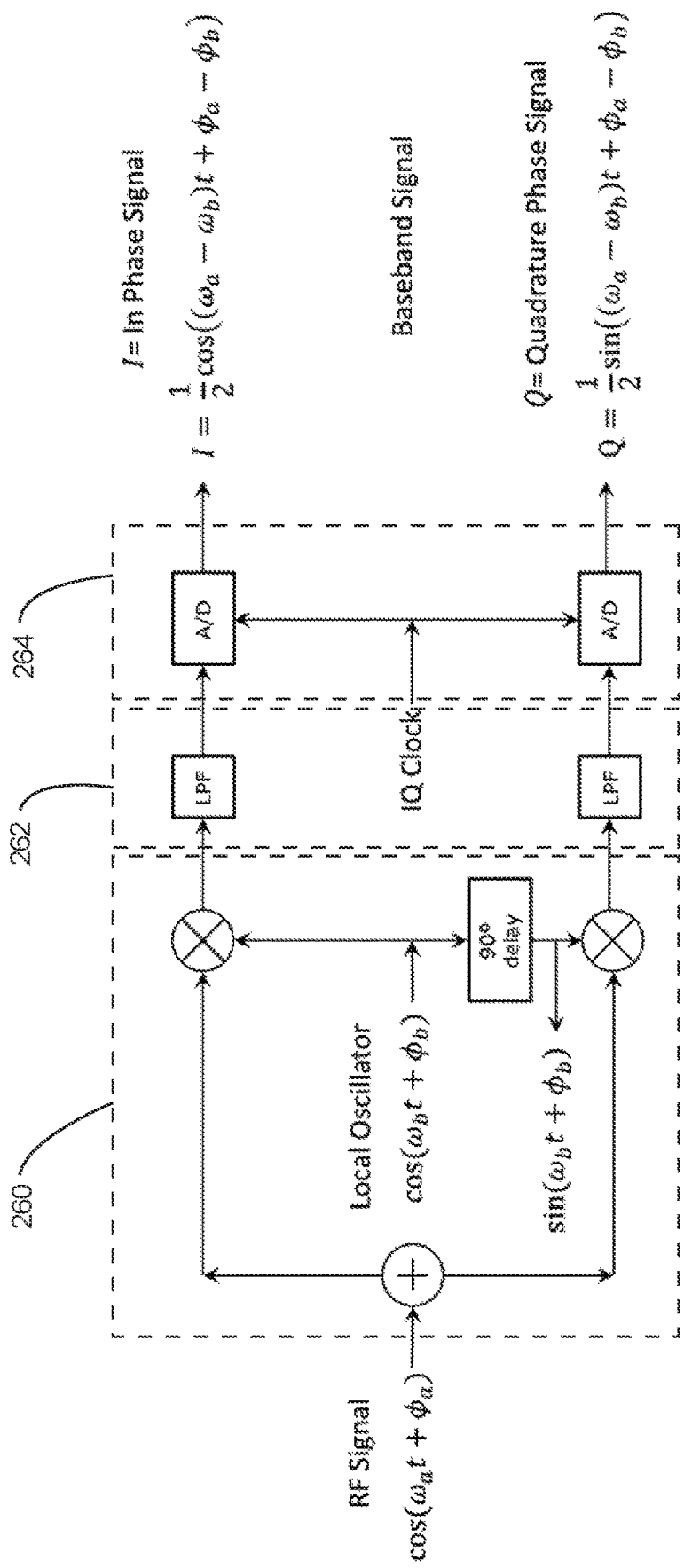
FIG. 10 shows a complex form of a transmission relative to time in accordance with one embodiment.

High frequency circuitry including aspects of the RF circuitry 204 in accordance with one embodiment is shown in FIGS. 9 and 10. The RF circuitry 204 is shown coupled to an antenna array 220, which is shown, for purposes of disclosure, to represent a single ended connection for the RF circuitry 204. The antenna array 220 may be replaced with any type of single ended connection, including the conditioning circuitry 216 for a high-frequency interface that provides a differential connection. The HF switch 208 is shown optional in phantom lines to indicate it may be present and that connections in addition to the antenna array 220 may be provided, including a connection to a HF interface 232 and the antenna array 220. The filter circuitry 206 in the illustrated embodiment is a bandpass filter, and may be varied depending on the configuration.

Multiple components of the RF circuitry 204 in the illustrated embodiment are coupled to an output from the clock 202, which includes a crystal 242 (e.g., a 32 MHz crystal) and a clock distribution system 244. In one embodiment, additional components of the object device 50 or sensor 40 may be coupled to the clock distribution system 244.

The RF circuitry 204 in the illustrated embodiment includes an output mixer stage and an input mixer stage. The RF circuitry 204 may include conditioning circuitry 240 (e.g., a switch and/or balun) and may be configured to selectively couple the single ended interface 205 of the RF circuitry 204 to the output mixer stage or the input mixer stage of the RF circuitry 204. The conditioning circuitry 240 in the illustrated embodiment may be configured to provide a single ended output to the input mixer stage, and to receive a differential input from the output stage.

Both the input and output stages of the RF circuitry 204 may be coupled to the same phase lock loop (PLL) 248. Optionally, the input and output stages of the RF circuitry 204 may be coupled to separate phase locked loops 248, 248O.

The RF circuitry 204 may include one or more timers 246 coupled to aspects of the input and output stages.

Turning to the output stage of the RF circuitry 204, a processor 250 may be configured to receive or generate a message or communication for transmission via the single ended interface 205 of the RF circuitry 204. The processor 250 may supply the communication for transmission to a protocol engine 252, which is operable to translate the communication according to a protocol defined with respect to high-frequency transmissions between devices. The output from the protocol engine 252 may be supplied to a Gaussian frequency shift keying (GFSK) modulator 254, which provides quadrature components (e.g., IQ form) corresponding to the form of the transmission output from the protocol engine 252. The quadrature components provided by the GFSK modulator 254 may be in a digital form that can be translated to an analog form and filtered by the D-to-A Converter 256 (e.g., a D-to-A Converter and low pass filter). The analog form of the quadrature components may be mixed or modulated in accordance with an oscillator output of the PLL 248. The oscillator output 249 (e.g., RF clock) may be selectable and correspond to a frequency of transmission within a frequency range, such as any frequency between 2.4 GHz and 2.48 GHz.

In the illustrated embodiment of FIG. 9, the oscillator output 249 can be mixed with the quadrature components of the transmission via a mixer 253 (e.g., an up converter). The output from the mixer 253 may be supplied to a power amplifier 251 and directed to the conditioning circuitry 244 output to the single ended interface 205.

Reception and processing of signals received via the single ended interface 205 may be directed along the input stage of the RF circuitry 204, as depicted in the illustrated embodiments of FIGS. 9 and 10. The conditioning circuitry 240 may switch to direct input from the single ended interface 205 to a receiver mixer stage 260, which may include a low noise amplifier 261 and a mixer 263. The mixer 263 may receive the oscillator output 249 from the PLL 248 (or alternatively receive an oscillator output from the optional separate PLL 248O). The mixer 263 may operate as a quadrature demodulator operable to demodulate the received high-frequency signal into quadrature components (e.g., IQ form or in-phase and quadrature phase signals). The quadrature components of the received signal may be directed to conditioning circuitry 262 (e.g., bandpass filter circuitry, low pass filter circuitry, amplification circuitry, or a combination thereof), with conditioned outputs of the quadrature components provided to an A-to-D converter 264. In the illustrated embodiment of FIGS. 9 and 10, the conditioning circuitry 262 may operate as a baseband filter, optionally with a low pass filter configuration or a bandpass filter configuration. The output of the A-to-D converter 264 in IQ form can be used as a basis for determining a signal characteristic of the received signal. Zero IF may yield PCTA and PCTB, respectively at each receiving device.

The outputs from the A-to-D converter 264 may correspond to the digital form of the quadrature components of the received signal, and may be supplied to demodulation circuitry 266 and a protocol engine 268 to yield a message or communication corresponding to the received signal.

IV. HF Interface Configurations

Figure 11:
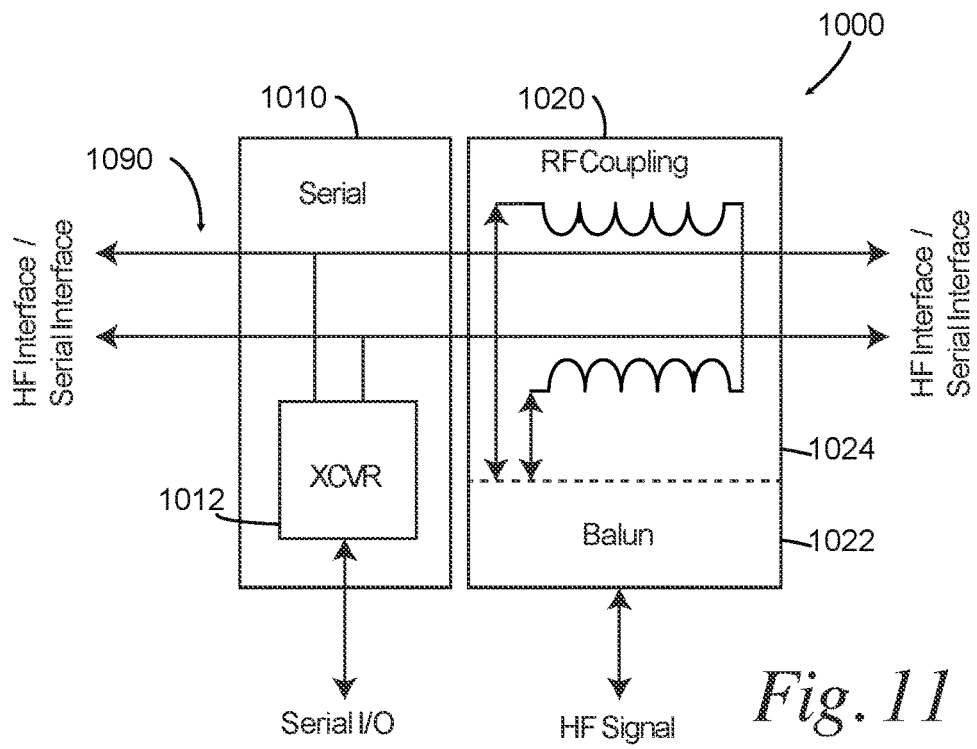
FIG. 11 shows a high frequency interface in accordance with one embodiment of the present disclosure.

A HF interface in accordance with one embodiment is depicted in FIG. 11 and generally designated 1000. The HF interface 1000, or aspects thereof, may be incorporated into any of the device configurations described herein in place of the HF interfaces described in conjunction with those configurations, including the HF interfaces 232, 232', 232".

The HF interface 1000 in the illustrated embodiment is configured for a physical medium 1090 in the form of a differential pair of conductors over which both high frequency communications and lower frequency, serial communications are transmitted. Alternatively, the lower frequency, serial communications and associated circuitry may be absent from the HF interface 1000.

The HF interface 1000 may include a serial coupler 1010 and a HF coupler 1020, respectively operable to receive and/or transmit serial communications and HF communications. The serial coupler 1010 may include a serial transceiver 1012 operable to transmit and receive serial communications via direct electrical connections to the physical medium 1090. For instance, the serial coupler 1010 may include electrical stub connections to the differential pair of conductors.

The HF interface 1000, in the illustrated embodiment, includes a HF coupler 1020 operable to receive and/or transmit HF communications via the physical medium 1090. The HF coupler 1020 may include a transformer-based coupler 1024 and a balun 1022 configured to facilitate HF communications via the physical medium 1090.

Figure 12:
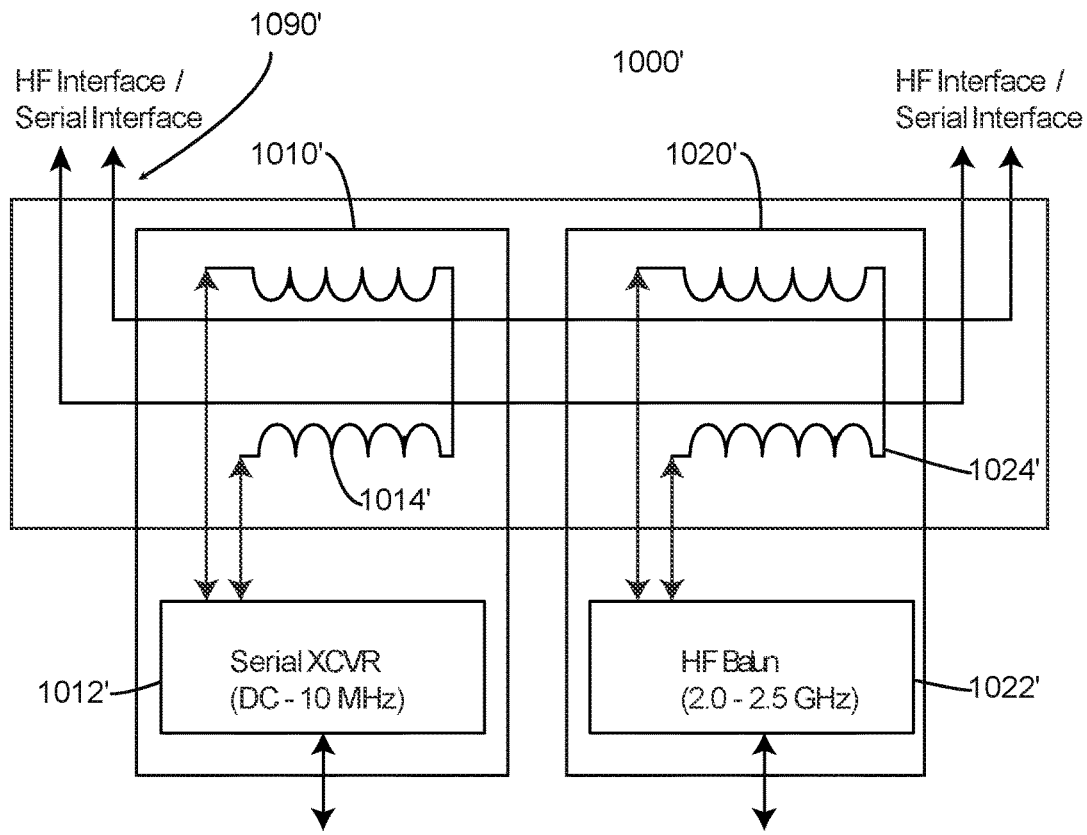
FIG. 12 shows a high frequency interface in accordance with one embodiment of the present disclosure.

A HF interface in accordance with an alternative embodiment is depicted in FIG. 12 and generally designated 1000'. The HF interface 1000' is similar in many respects to the HF interface 1000, and may similarly be incorporated into any of the device configurations described herein in place of the HF interfaces described in conjunction with those configurations, including the HF interfaces 232, 232', 232".

The HF interface 1000' includes a serial coupler 1010' and a HF coupler 1020', similar to the serial coupler 1010 and the HF coupler 1020 described herein, with the exception of the serial coupler 1010' including a transformer-based coupler 1014' configured to couple communications to the physical medium (e.g., a differential pair of conductors). The transceiver 1012', the balun 1022', and the transformer-based coupler 1024' may be configured in a manner similar to elements of the HF interface 1000 with the same reference number without the '.

Although the serial couplers 1010, 1010', as well as the HF interfaces 232, 232', 232", are depicted in some embodiments as including a transceiver (e.g., a serial transceiver), it is to be understood that the transceiver may be separate from the serious coupler and the HF interface.

Figure 13:
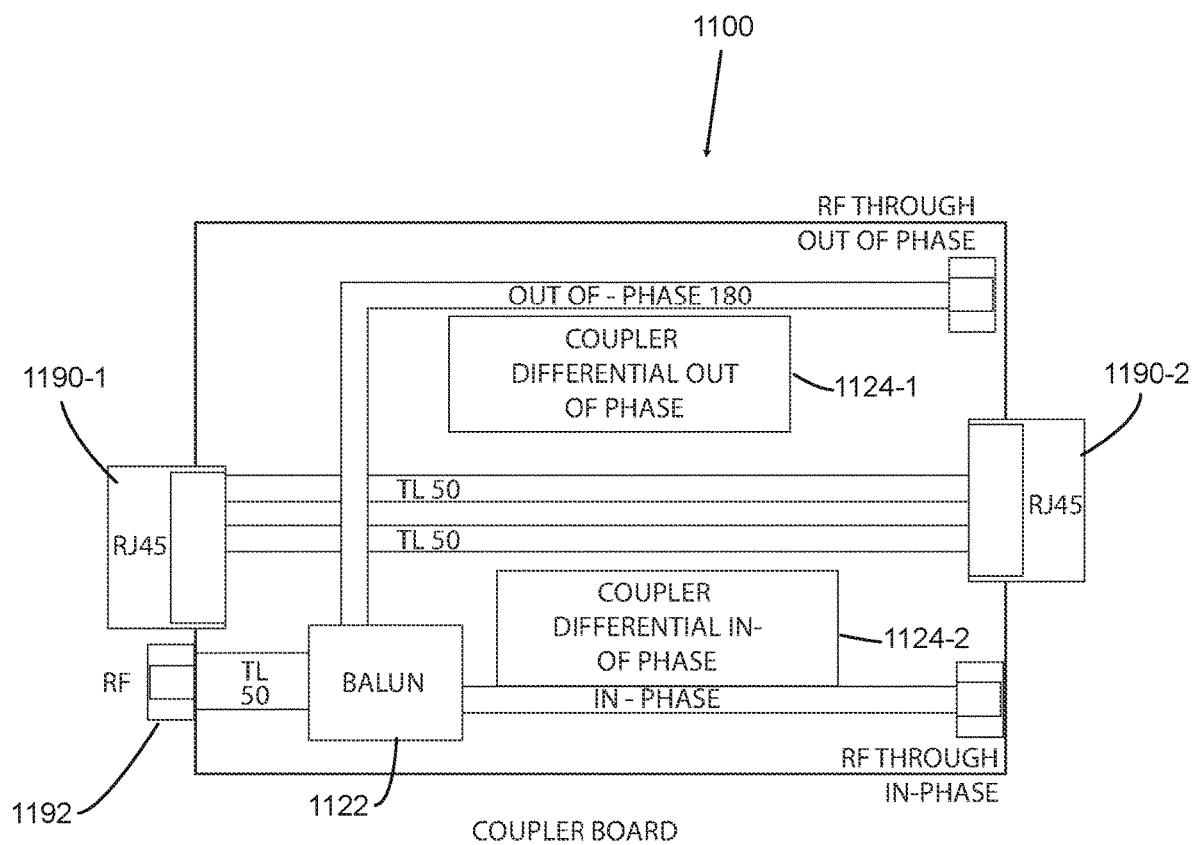
FIG. 13 shows a high frequency interface in accordance with one embodiment of the present disclosure.

A HF interface in accordance with one embodiment is depicted in FIG. 13 and generally designated 1100. The HF interface 1100 is configured for coupling single-ended communications (e.g., communications received via an antenna or a single-ended physical interface, such as coax) to a differential configuration, or coupling differential signals to a single-ended configuration, or both. The HF interface 1100 in the illustrated embodiment includes a plurality of connectors 1190-1, 1190-2, 1192. One or more of these connectors 1190-1, 1190-2, 1192 may be differential (e.g., connectors 1190-1, 1190-2), and one or more of these connectors 1190-1, 1190-2, 1192 may be singled ended (e.g., connector 1192). The HF interface 1100 may include a balun 1120 operable to facilitate transformation between single ended communications and differential communications, with the balun 1120 in the illustrated embodiment transforming between in-phase and out-of-phase signals of a differential form and a single signal. The in-phase and out-of-phase signals may be coupled respectively to conductors of the differential connectors 1190-1, 1190-2 via an in-phase coupler 1124-2 and an out-of-phase coupler 1124-1. The in-phase coupler 1124-2 and the out-of-phase coupler 1124 may be transformers. The balun 1122, the in-phase coupler 1124-2, and the out-of-phase coupler 1124-1 may enable bidirectional translation of communications transmitted via the differential configuration and the single-ended configuration. For instance, the in-phase and out-of-phase signals may correspond to signals received (or transmitted) via the singled ended connector 1192 or the differential connectors 1190-1, 1190-2, or any combination thereof. The in-phase and out-of-phase signals may be provided to or generated by, or both, the RF circuitry 204 in accordance with one or more embodiments described herein.

Figure 14:
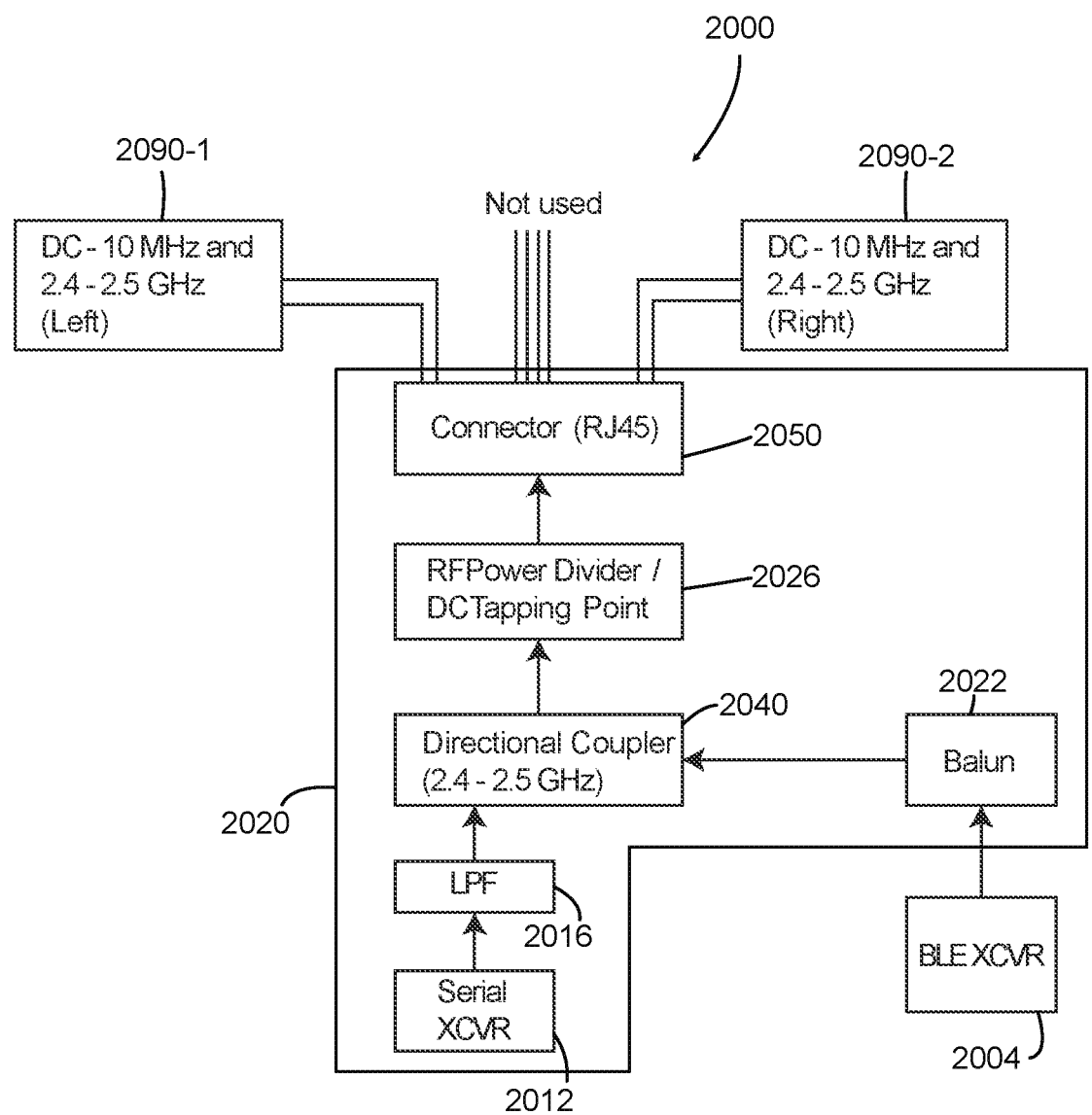
FIG. 14 shows a high frequency interface in accordance with one embodiment of the present disclosure.

Turning to the illustrated embodiment of FIG. 14, a HF interface in accordance with one embodiment is shown and designated 2000. The HF interface 2000, or aspects thereof, may be incorporated into any of the device configurations described herein in place of the HF interfaces described in conjunction with those configurations, including the HF interfaces 232, 232', 232", 1000. The HF interface 2000 in the illustrated embodiment includes a HF coupler 2020 configured for both high frequency and serial communications.

The HF coupler 2020 in the illustrated embodiment includes a connector 2050 configured to facilitate connection to one or more physical mediums for transmission of communications. For instance, the connector 2050 may enable connection to first and second physical mediums 2090-1, 2090-2, which may be utilized by the HF interface 2000 for communications. The first and second mediums 2090-1, 2090-2 may be isolated from each other such that communications from the first medium 2090-1 do not inherently flow through to the second medium 2090-2. Alternatively, communications on one of the first and second mediums 2090-1, 2090-2 may inherently flow through to the other of the first and second mediums 2090-1, 2090-2.

The HF coupler 2020 in the illustrated embodiment includes a power divider 2026.

The HF coupler 2020 may include a directional coupler 2040 configured to receive both high frequency and serial communications.

The HF coupler 2020 in the illustrated embodiment may include a low pass filter 2016 and a serial transceiver 2012, which may be similar to the serial transceiver 1012 described herein.

The HF coupler 2020 may include a balun 2022 operable to facilitate receipt and transmission of high-frequency communications. The balun 2022 may be coupled to the directional coupler 2040 and a high-frequency transceiver 2004, which may be configured similar to the RF circuitry 204 described herein. The high-frequency transceiver 2004 in one embodiment may be a Bluetooth transceiver.

Figure 15:
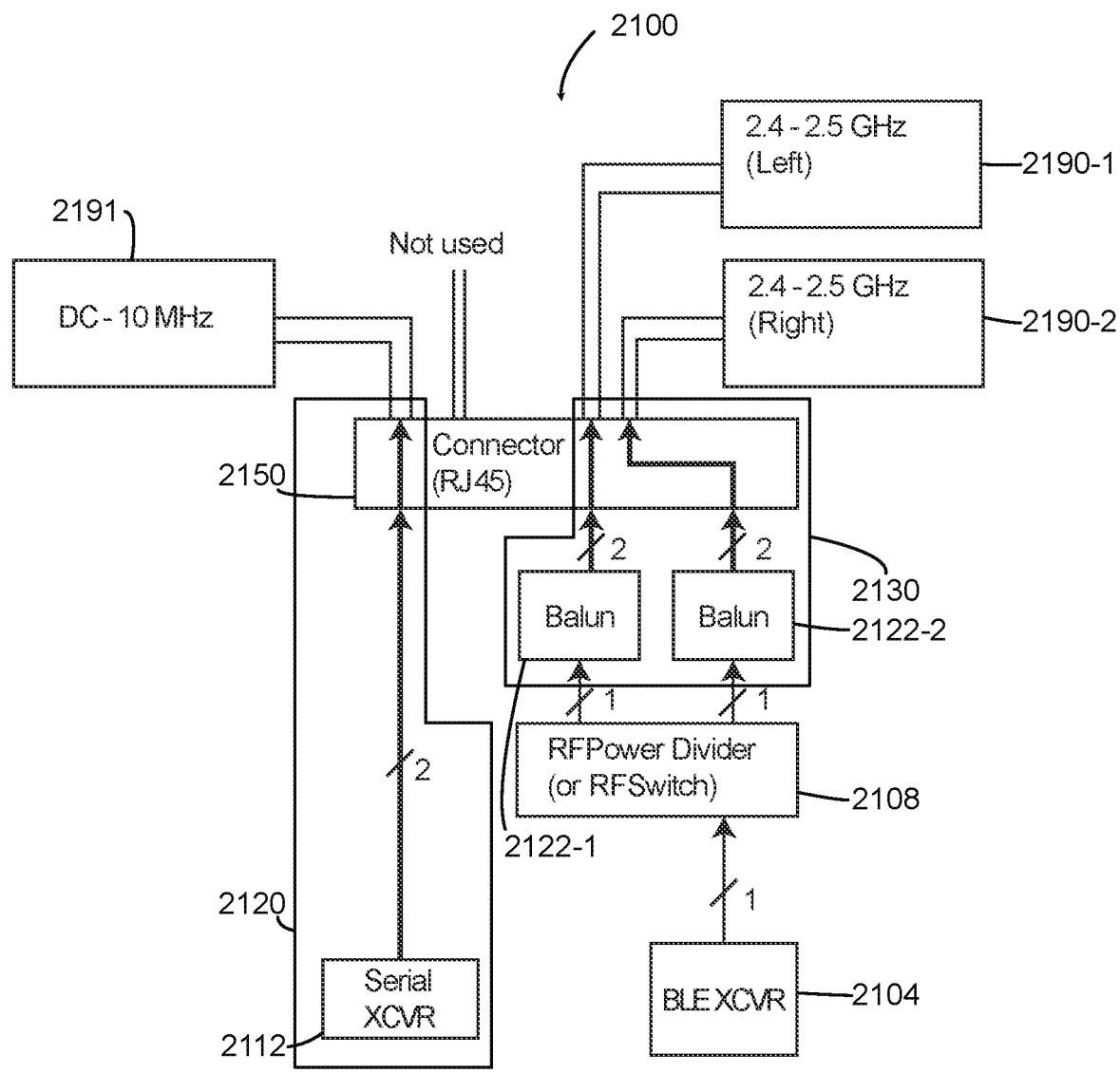
FIG. 15 shows a high frequency interface in accordance with one embodiment of the present disclosure.

In the illustrated embodiment of FIG. 15, a HF interface in accordance with one embodiment is shown and designated 2100. The HF interface 2100, or aspects thereof, may be incorporated into any of the device configurations described herein in place of the HF interfaces described in conjunction with those configurations, including the HF interfaces 232, 232', 232'', 1000, 2000. The HF interface 2100 in the illustrated embodiment includes a HF coupler 2130 configured for high frequency communications, and a serial coupler 2120 configured for serial communications.

The HF coupler 2120 in the illustrated embodiment includes a connector 2150 configured to facilitate connection to one or more physical mediums for transmission of communications. For instance, the connector 2150 may enable connection to first and second physical mediums 2190-1, 2190-2, which may be utilized by the HF interface 2100 for communications. The first and second mediums 2090-1, 2090-2 may be isolated from each other such that communications from the first medium 2090-1 do not inherently flow through to the second medium 2090-2. Alternatively, communications on one of the first and second mediums 2090-1, 2090-2 may inherently flow through to the other of the first and second mediums 2090-1, 2090-2. The connector 2150 may further enable connection to a physical medium 2191 for lower frequency communications (e.g., serial communications at a transmission frequency less than 10 MHz).

The serial coupler 2120 in the illustrated embodiment may include a serial transceiver 2012, which may be similar to the serial transceiver 1012 described herein.

The HF coupler 2130 in the illustrated embodiment may include a first balun 2122-1 operable to facilitate receipt and transmission of high-frequency communications via the first physical medium 2190-1. The HF coupler 2030 may also include a second balun 2122-2 operable to facilitate receipt and transmission of high-frequency communications via the second physical medium 2190-2.

The first and second baluns 2122-1, 2122-2 may be selectively coupled to a high-frequency transceiver 2004, which may be configured similar to the RF circuitry 204 described herein. The high-frequency transceiver 2004 in one embodiment may be a Bluetooth transceiver. Selective coupling of the first and second baluns 2122-1, 2122-2 may be facilitated via a HF switch 2108, which may be similar to the HF switch 208 described herein.

Figure 16:
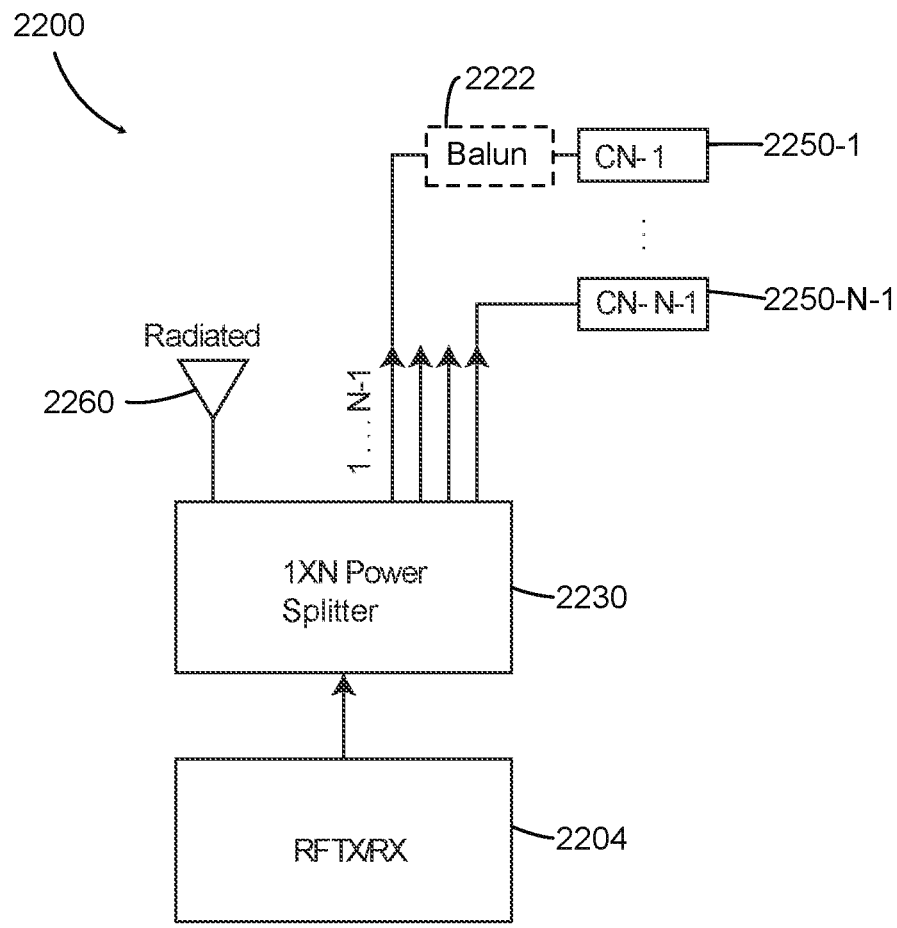
FIG. 16 shows a high frequency interface in accordance with one embodiment of the present disclosure.

In the illustrated embodiment of FIG. 16, a HF interface in accordance with one embodiment is shown and designated 2200. The HF interface 2200, or aspects thereof, may be incorporated into any of the device configurations described herein in place of the HF interfaces described in conjunction with those configurations, including the HF interfaces 232, 232', 232'', 1000, 1000', 2000, 2100. The HF interface 2200 in the illustrated embodiment includes a HF coupler 2230 configured for high frequency communications relative to a plurality of single ended or differential configurations, including radiated configurations 2260 or physical mediums (via physical connectors 2250), or a combination thereof.

The HF interface 2200 in the illustrated embodiment includes a HF transceiver 2204, which may be configured similar to the RF circuitry 204 described herein. The HF transceiver 2204 in one embodiment may be a Bluetooth transceiver.

The HF transceiver 2204 may be configured to transmit and receive communications via a HF coupler 2230, which may be operably coupled to a plurality of communication nodes, including physical mediums or a radiated configuration 2260 (e.g., an antenna) for communications. The HF coupler 2230 in the illustrated embodiment is configured to enable inherent pass through from one communication node to another. Alternatively, the HF coupler 2230 may not be configured for inherent pass through of communications between communication nodes (e.g., between the radiated configuration 2260 and a physical connector 2250-1).

The physical connectors 2250-1 ... N in the illustrated embodiment correspond to a plurality of physical mediums for which HF communications may be transmitted and received. The physical connectors 2250-1 ... N may each be single ended or differential, such that one or more (or all) of the physical connectors 2250-1 ... N may be single ended, and some or more (or all) of the physical connectors 2250-1 ... N may be differential.

Optionally, a balun 2222 may be provided with respect to one or more of the communication nodes, as shown in the illustrated embodiment with respect to the connector 2250-1. The balun 2222 may facilitate connection to a differential physical connector and associated physical medium.

The physical connectors 2250-1 ... N may be single end (custom or standard) or differential (custom or standard, such as CAN or RJ45), or any combination thereof.

Figure 17:
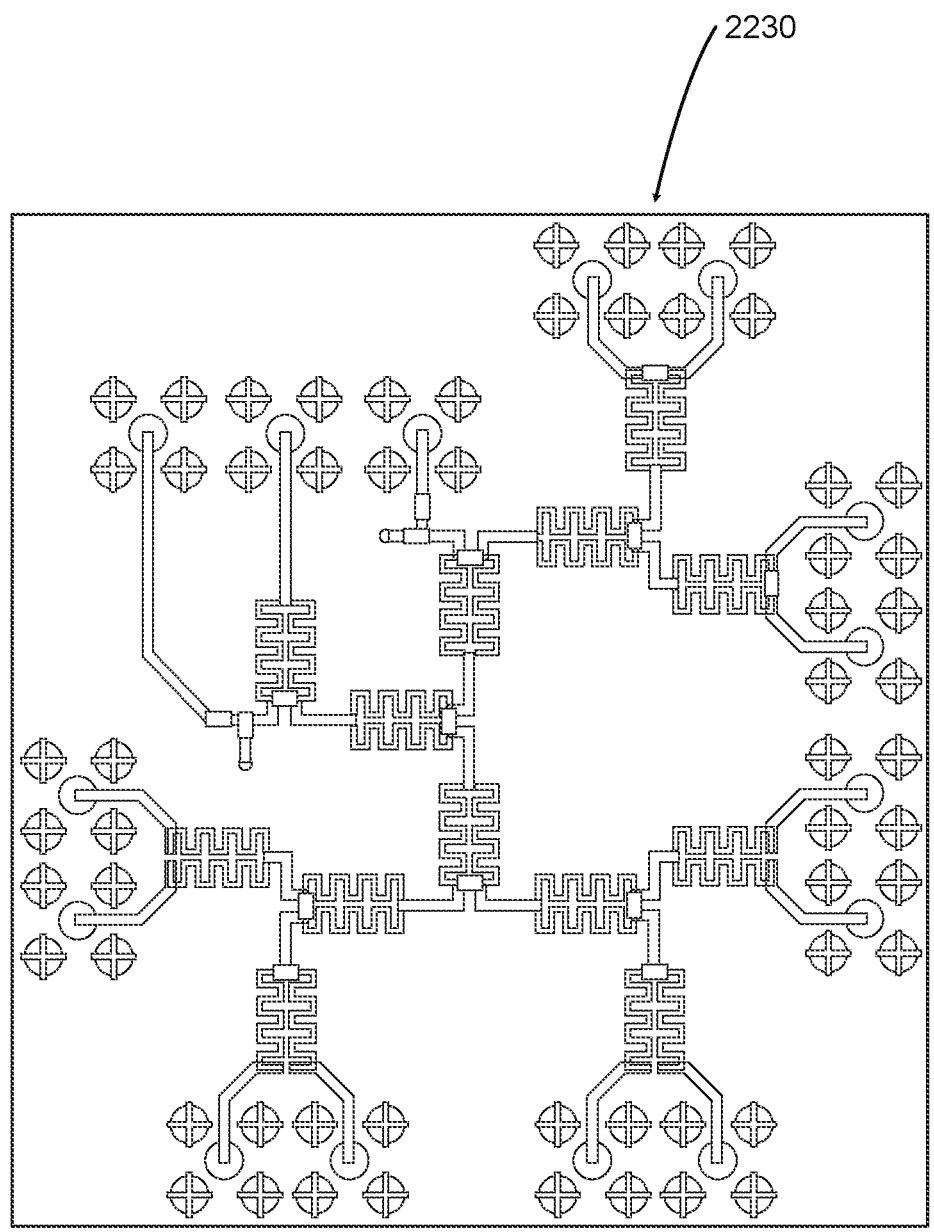
FIG. 17 shows a coupler in accordance with one embodiment of the present disclosure.
Figure 20:
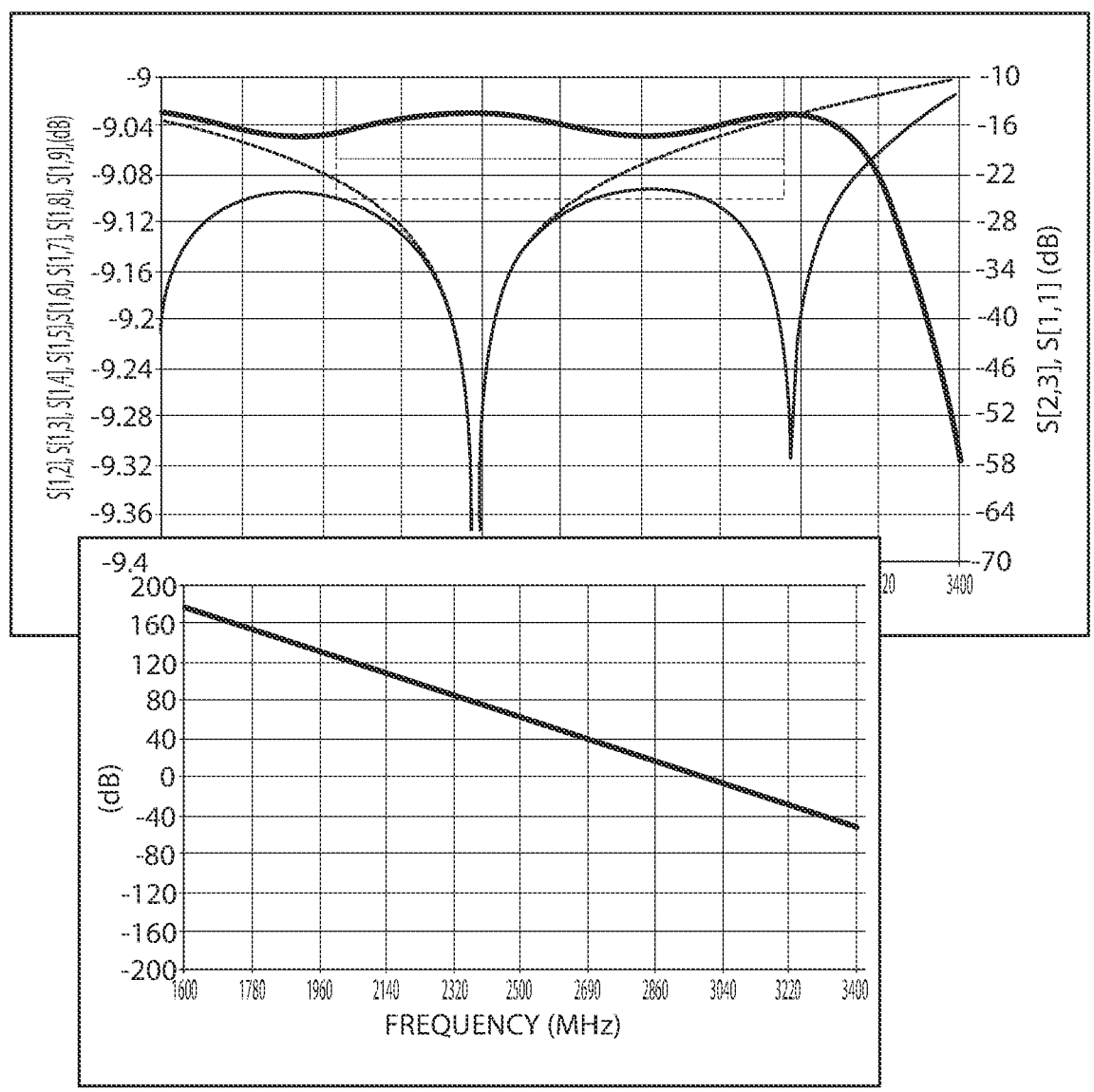
FIG. 20 shows a coupler in accordance with one embodiment of the present disclosure.
Figure 21:
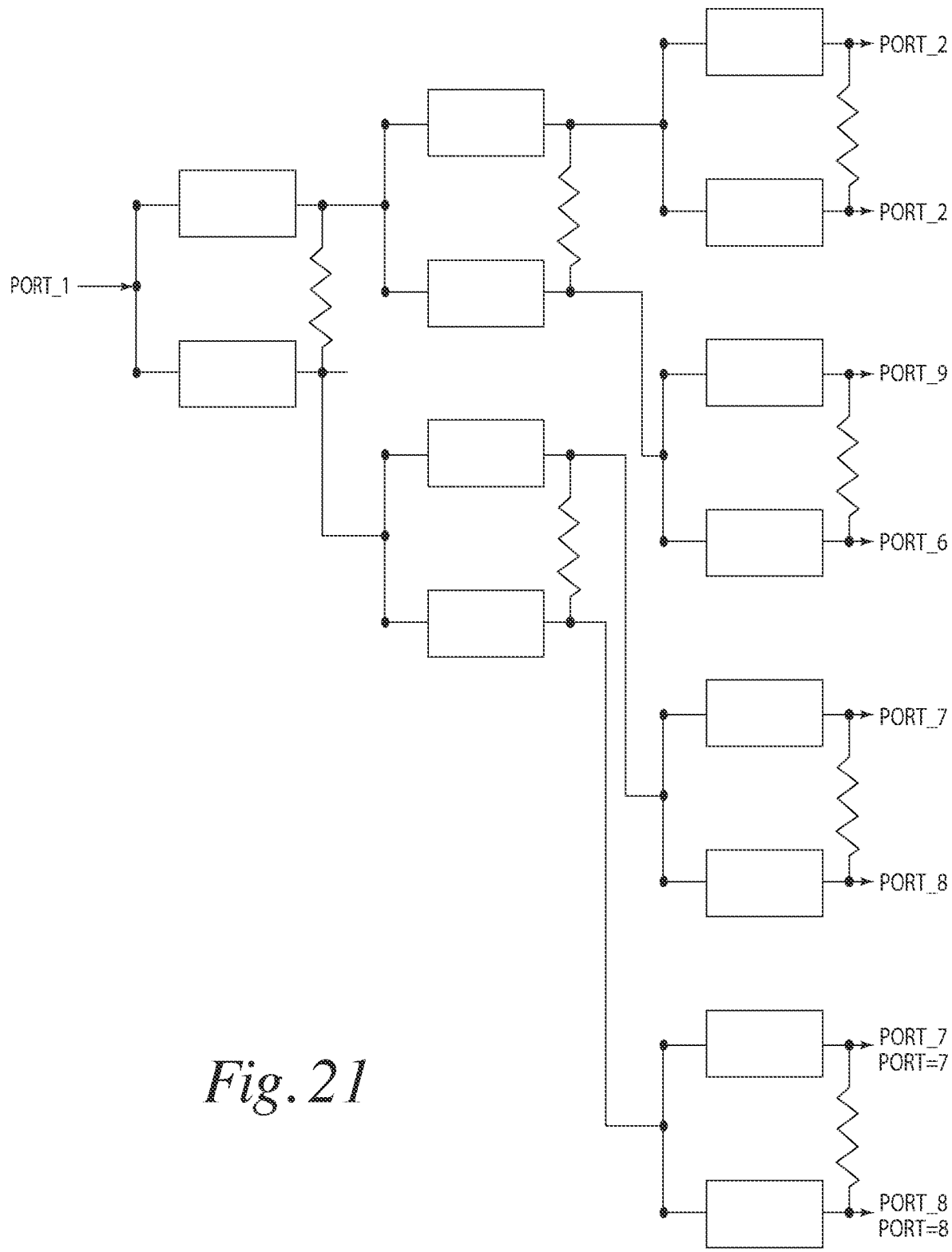
FIG. 21 shows a plot associated with the coupler depicted in FIG. 20.

The HF coupler 2230 is shown in further detail in accordance with one embodiment in FIG. 17.

Additional examples of HF couplers 2230 are depicted in the illustrated embodiments of FIGS. 18-21.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A system comprising:
a first object device disposed in a fixed position relative to an object, the first object device having a first antenna system configured to receive wireless communication signals from a remote device in accordance with a device signaling protocol;
the first object device including a first high-frequency interface operable to transmit and receive communication signals via a physical medium, the first high-frequency interface configured to communicate via the physical medium in accordance with the device signaling protocol;
a second object device disposed in a fixed position relative to the object, the second object device having a second antenna system configured to receive wireless signals from the remote device in accordance with the device signaling protocol;
the second object device including a second high-frequency interface operable to transmit and receive communication signals with the first object device via the physical medium, the second high-frequency interface configured to communicate via the physical medium in accordance with the device signaling protocol; and
a control system configured to obtain signal information pertaining to the wireless signals received from the remote device, the control system configured to determine a range of the remote device relative to the object based on the signal information, wherein the signal information is transmitted from the second object device to the first object device via the physical medium in accordance with the device signaling protocol.

2. The system of claim 1 wherein the second object device includes the control system.

3. The system of claim 1 wherein the first object device includes:

RF circuitry operable to transmit and receive signals in accordance with the device signaling protocol; and
high-frequency circuitry coupled to the RF circuitry, the first antenna system, and the first high-frequency interface, the high-frequency circuitry configured to direct signals between the RF circuitry and the first antenna system and the first high-frequency interface.

4. The system of claim 3 wherein the high-frequency circuitry is high-frequency switching circuitry operable to selectively direct signals between the RF circuitry and the first antenna system and the first high-frequency interface.

5. The system of claim 4 wherein the high-frequency circuitry includes high-frequency splitter circuitry operable to split an RF signal received from the RF circuitry to direct the RF signal to at least one of the first antenna system and the first high-frequency interface.

6. The system of claim 5 wherein the high-frequency splitter circuitry is operable as high-frequency combiner circuitry configured to direct one or more signals received from the at least one of the first antenna system and the first high-frequency interface to the RF circuitry.

7. The system of claim 6 wherein the RF circuitry includes a single ended interface operable to supply the RF signal and receive a signal from the at least one of the first antenna system and the first high-frequency interface via the high-frequency combiner circuitry.

8. The system of claim 5 wherein the high-frequency splitter circuitry includes:
a single ended input operable to receive the RF signal from the RF circuitry; and
a differential output coupled to the first high-frequency interface, the differential output operable to supply first and second differential signals to the first high-frequency interface for transmission to the second object device via the physical medium.

9. The system of claim 8 wherein the high-frequency splitter circuitry includes a single ended output coupled to the first antenna system, the single ended output operable to supply a single ended signal to the first antenna system for wireless transmission to the remote device.

10. The system of claim 1 wherein the first object device includes a serial interface coupled to a serial transceiver operable to transmit and receive serial signals via the serial interface, the serial interface configured to transmit and receive the serial signals via the physical medium, wherein the physical medium is shared by the serial interface and the first high-frequency interface such that the communication signals transmitted in accordance with the device signaling protocol are superimposed with the serial signals.

11. The system of claim 10 wherein the first object device includes a signal coupler operable to combine and split the communication signals in the serial signals for respective transmission and reception.

12. A method of communicating between first and second object devices disposed on an object, the first and second object devices coupled together via a physical medium, the method comprising:
receiving, in the first object device, wireless communication signals from a remote device in accordance with a device signaling protocol;
determining signal information pertaining to the wireless communication signals received from the remote device;
transmitting, via the physical medium coupled to the first object device, communication signals in accordance with the device signaling protocol, wherein the signal information is encoded in the communication signals;

receiving, in the second object device, wireless communication signals from the remote device in accordance with the device signaling protocol;

receiving, via the physical medium coupled to the second object device, the communication signals transmitted in accordance with the device signaling protocol; and determining a range of the remote device relative to the object based on the signal information received from the first object device.

13. The method of claim 12 comprising:

splitting an RF signal received from RF circuitry of the first object device to direct the RF signal to at least one of a first antenna system and a first high-frequency interface of the first object device; and directing one or more signals received from the at least one of the first antenna system and the first high-frequency interface to the RF circuitry.

14. The method of claim 13 comprising supplying a first differential signal via first and second mediums that are paired to the first high-frequency interface, wherein the first differential signal is based on the RF signal received from the RF circuitry.

15. The method of claim 12 comprising providing a serial transceiver operable to transmit serial communications via a serial interface that is coupled to the physical medium, whereby the physical medium includes both communication signals transmitted in accordance with the device signaling protocol and serial communications transmitted by the serial transceiver.

16. An object device disposed on an object and configured to determine a range of a remote device, the object device comprising:

an antenna system configured to receive wireless communication signals transmitted by the remote device in accordance with a device signaling protocol;

a high-frequency interface operable to transmit and receive communication signals via a physical medium, the high-frequency interface configured to communicate via the physical medium in accordance with the device signaling protocol;

a control system configured to determine a range of the remote device relative to the object based on signal information obtained with respect to the wireless communication signals transmitted by the remote device; and the control system operably coupled to the high-frequency interface, the control system configured to direct transmission and reception of communication signals via the high-frequency interface for transmission and receipt of data from another object device disposed on the object.

17. The object device of claim 16 comprising:

RF circuitry operable to transmit and receive signals in accordance with the device signaling protocol; and high-frequency circuitry coupled to the RF circuitry, the antenna system, and the high-frequency interface, the high-frequency circuitry configured to direct signals between the RF circuitry and the antenna system and the high-frequency interface.

18. The object device of claim 17 wherein the high-frequency circuitry is high-frequency switching circuitry operable to selectively direct signals between the RF circuitry and the antenna system and the high-frequency interface.

19. The object device of claim 17 wherein the high-frequency circuitry includes high-frequency splitter circuitry operable to split an RF signal received from the RF circuitry to direct the RF signal to at least one of the antenna system and the high-frequency interface.

20. The object device of claim 19 wherein the high-frequency splitter circuitry is operable as high-frequency combiner circuitry configured to direct one or more signals received from the at least one of the antenna system and the high-frequency interface to the RF circuitry.

21. The object device of claim 20 wherein the RF circuitry includes a single ended interface operable to supply the RF signal and receive a signal from the at least one of the antenna system and the high-frequency interface via the high-frequency combiner circuitry.

22. The object device of claim 19 wherein the high-frequency splitter circuitry includes:

a single ended input operable to receive the RF signal from the RF circuitry; and a differential output coupled to the high-frequency interface, the differential output operable to supply in-phase and out-of-phase signals to the high-frequency interface for transmission to the other object device via the physical medium.

23. The object device of claim 22 wherein the high-frequency splitter circuitry includes a single ended output coupled to the antenna system, the single ended output operable to supply a single ended signal to the antenna system for wireless transmission to the remote device.

24. The object device of claim 16 comprising a serial interface coupled to a serial transceiver operable to transmit and receive serial signals via the serial interface, the serial interface configured to transmit and receive the serial signals via the physical medium, wherein the physical medium is shared by the serial interface and the high-frequency interface such that the communication signals transmitted in accordance with the device signaling protocol are superimposed with the serial signals.

25. The object device of claim 24 comprising a signal coupler operable to combine and split the communication signals in the serial signals for respective transmission and reception.

* * * * *